US010935664B2

(12) United States Patent  
Berger et al.

(10) Patent No.: US 10,935,664 B2  
(45) Date of Patent: Mar. 2, 2021

(54) NULL DATA PACKET (NDP) ANNOUNCEMENT FRAME FOR NDP RANGING

(71) Applicant: NXP USA, Inc., Austin, TX (US)

(72) Inventors: Christian R. Berger, San Jose, CA (US); Liwen Chu, San Ramon, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/555,900

(22) Filed: Aug. 29, 2019

(65) Prior Publication Data

US 2020/0132857 A1    Apr. 30, 2020

Related U.S. Application Data

(60) Provisional application No. 62/753,600, filed on Oct. 31, 2018.

(51) Int. Cl.
*G01S 19/25* (2010.01)
*G01S 19/42* (2010.01)
(Continued)

(52) U.S. Cl.
CPC ............ *G01S 19/256* (2013.01); *G01S 19/42* (2013.01); *H04W 4/029* (2018.02); *H04W 24/10* (2013.01);
(Continued)

(58) Field of Classification Search
CPC ........ G01S 19/256; G01S 19/42; G01S 13/74; G01S 13/765; G01S 11/00; H04W 4/029;
(Continued)

(56) References Cited

U.S. PATENT DOCUMENTS

2005/0026563 A1    2/2005    Leeper et al.
2011/0128929 A1    6/2011    Liu et al.
(Continued)

OTHER PUBLICATIONS

IEEE Std 802.11ac™-2013 "IEEE Standard for Information Technology-Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

(Continued)

*Primary Examiner* — Minjung Kim

(57) ABSTRACT

A first communication device generates a null data packet (NDP) announcement (NDPA) frame to announce a subsequent transmission of one or more NDPs to one or more second communication devices as part of a ranging measurement procedure. The NDPA frame is generated to include a training signal repetition field that specifies a number of instances of a training signal to be included in the one or more NDPs. The first communication device transmits the NDPA frame as part of the ranging measurement procedure. The first communication device generates at least one NDP to include a number of instances of the training signal that equals the number of instances of the training signal indicated by the training signal repetition field in the NDPA, and after transmitting the NDPA frame, transmits the at least one NDP as part of the ranging measurement procedure.

14 Claims, 11 Drawing Sheets

(51) Int. Cl.
    *H04W 64/00*   (2009.01)
    *H04W 4/029*   (2018.01)
    *H04W 56/00*   (2009.01)
    *H04W 24/10*   (2009.01)
    *H04W 12/10*   (2021.01)
(52) U.S. Cl.
    CPC ....... *H04W 56/001* (2013.01); *H04W 64/003* (2013.01); *H04W 12/1008* (2019.01)
(58) Field of Classification Search
    CPC . H04W 24/10; H04W 56/001; H04W 64/003; H04W 12/1008; H04L 27/2602
    See application file for complete search history.

(56) References Cited

U.S. PATENT DOCUMENTS

| | | | |
|---|---|---|---|
| 2016/0323879 A1 | 11/2016 | Ghosh et al. | |
| 2018/0027561 A1 | 1/2018 | Segev et al. | |
| 2018/0292518 A1* | 10/2018 | Chu | G01S 11/02 |
| 2018/0323837 A1* | 11/2018 | Park | H04L 25/02 |
| 2018/0331749 A1* | 11/2018 | Ghosh | H04J 3/0658 |
| 2019/0014466 A1* | 1/2019 | Seok | H04W 12/12 |
| 2019/0165883 A1* | 5/2019 | Chun | H04L 1/0026 |
| 2020/0112350 A1* | 4/2020 | Yang | H04B 7/0456 |
| 2020/0132857 A1* | 4/2020 | Berger | G01S 11/02 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11-REVmc™/D8.0, Aug 2016, "Draft Standard for Information technology Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).

Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).

International Search Report and Written Opinion in International Patent Application No. PCT/US2019/048880, dated Dec. 11, 2019 (13 pages).

IEEE P802.11ax™/D3.2, "Draft Standard for Information technology—Telecommunications and information exchange between systems; Local and metropolitan area networks—Specific requirements; Part 11: Wireless LAN Medium Access Control (MAC) and Physical Layer (PHY) Specifications; Amendment 1: Enhancements for High Efficiency WLAN," vol. 802.11ax drafts, No. D3.2, pp. 1-698 (Oct. 16, 2018).

* cited by examiner

FIG. 4A *Prior Art*

NULL DATA PACKET (NDP) ANNOUNCEMENT FRAME FOR NDP RANGING

CROSS REFERENCES TO RELATED APPLICATIONS

This application claims the benefit of U.S. Provisional Patent Application No. 62/753,600, entitled "Null Data Packet (NDP) Announcement Frame for Next Generation Positioning (NGP)—11az," filed on Oct. 31, 2018, which is hereby expressly incorporated herein by reference in its entirety.

FIELD OF TECHNOLOGY

The present disclosure relates generally to wireless communication systems, and more particularly to communication exchanges between wireless communication devices for measuring distances among the wireless communication devices.

BACKGROUND

Some mobile communication devices include a wireless local area network (WLAN) network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., or within a tunnel, etc.

Techniques for determining a position of a communication device using WLAN technology are now under development. For example, a distance between a first communication and a second communication device is determined by measuring a time of flight of WLAN transmissions between the first communication device and the second communication device. Distances between the first communication device and multiple third communication devices are also determined in a similar manner. Then, the determined distances are used to estimate a location of the first communication device by employing, for example, a triangulation technique.

Some communication devices transmit null data packets (NDPs) for determining times of flight. Prior to a communication device transmitting an NDP for a ranging measurement, the communication device typically transmits an NDP announcement (NDPA) frame so that other communication devices can prepare for receiving the NDP.

SUMMARY

In an embodiment, a method for announcing transmission of one or more null data packets (NDPs) during a ranging measurement procedure includes: generating, at a first communication device, an NDP announcement (NDPA) frame to announce a subsequent transmission of the one or more NDPs to one or more second communication devices as part of the ranging measurement procedure, wherein generating the NDPA frame comprises: including in the NDPA frame a training signal repetition field that specifies a number of instances of a training signal to be included in the one or more NDPs; transmitting, by the first communication device, the NDPA frame as part of the ranging measurement procedure; generating, at the first communication device, at least one NDP to include one or more instances of the training signal, wherein a number of instances of the training signal in the at least one NDP equals the number of instances of the training signal indicated by the training signal repetition field in the NDPA, and wherein the at least one NDP is among the one or more NDPs; after transmitting the NDPA frame, transmitting, by the first communication device, the one or more NDPs as part of the ranging measurement procedure.

In another embodiment, a wireless device comprises: a network interface device associated with a first communication device; the network interface device is implemented on one or more integrated circuit (IC) devices; and the network interface device is configured to: generate an NDPA frame to announce a subsequent transmission of one or more NDPs to one or more second communication devices as part of a ranging measurement procedure, wherein generating the NDPA frame comprises: including in the NDPA frame a training signal repetition field that specifies a number of instances of a training signal to be included in the one or more NDPs, transmit the NDPA frame as part of the ranging measurement procedure, generate at least one NDP to include one or more instances of the training signal, wherein a number of instances of the training signal in the at least one NDP equals the number of instances of the training signal indicated by the training signal repetition field in the NDPA, and wherein the at least one NDP is among the one or more NDPs, and after transmitting the NDPA frame, transmit the one or more NDPs as part of the ranging measurement procedure.

BRIEF DESCRIPTION OF THE DRAWINGS

FIG. 4A is a diagram of a prior art null data packet (NDP) format.

DETAILED DESCRIPTION

Communication devices perform ranging measurement packet exchanges that include the transmission of null data packets (NDPs). Prior to a communication device transmitting an NDP for a ranging measurement, the communication device transmits an NDP announcement (NDPA) frame, in some scenarios discussed below, to prepare other communication devices for the transmission of the NDP. In various embodiments described below, the NDPA frame includes information that is useful for and/or specific to the ranging measurement packet exchange. As an illustrative example, NDPs for ranging measurement packet exchanges have different formats than NDPs used in a wireless network for other purposes, and the NDPA frame includes information that indicates a format of the NDP to be transmitted so that other communication devices can properly process the NDP, according to an embodiment. As another illustrative example, the NDPA frame for ranging measurement packet exchanges includes information needed for ranging measurement packet exchanges but that is not relevant when NDPs are transmitted in the wireless network for other purposes, according to an embodiment.

Ranging measurement packet exchanges are described below in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, NDPA frame formats similar to the examples described below are utilized in other types of wireless communication systems such as personal area networks (PANs), mobile communication networks such as cellular networks, metropolitan area networks (MANs), etc.

Figure 1:
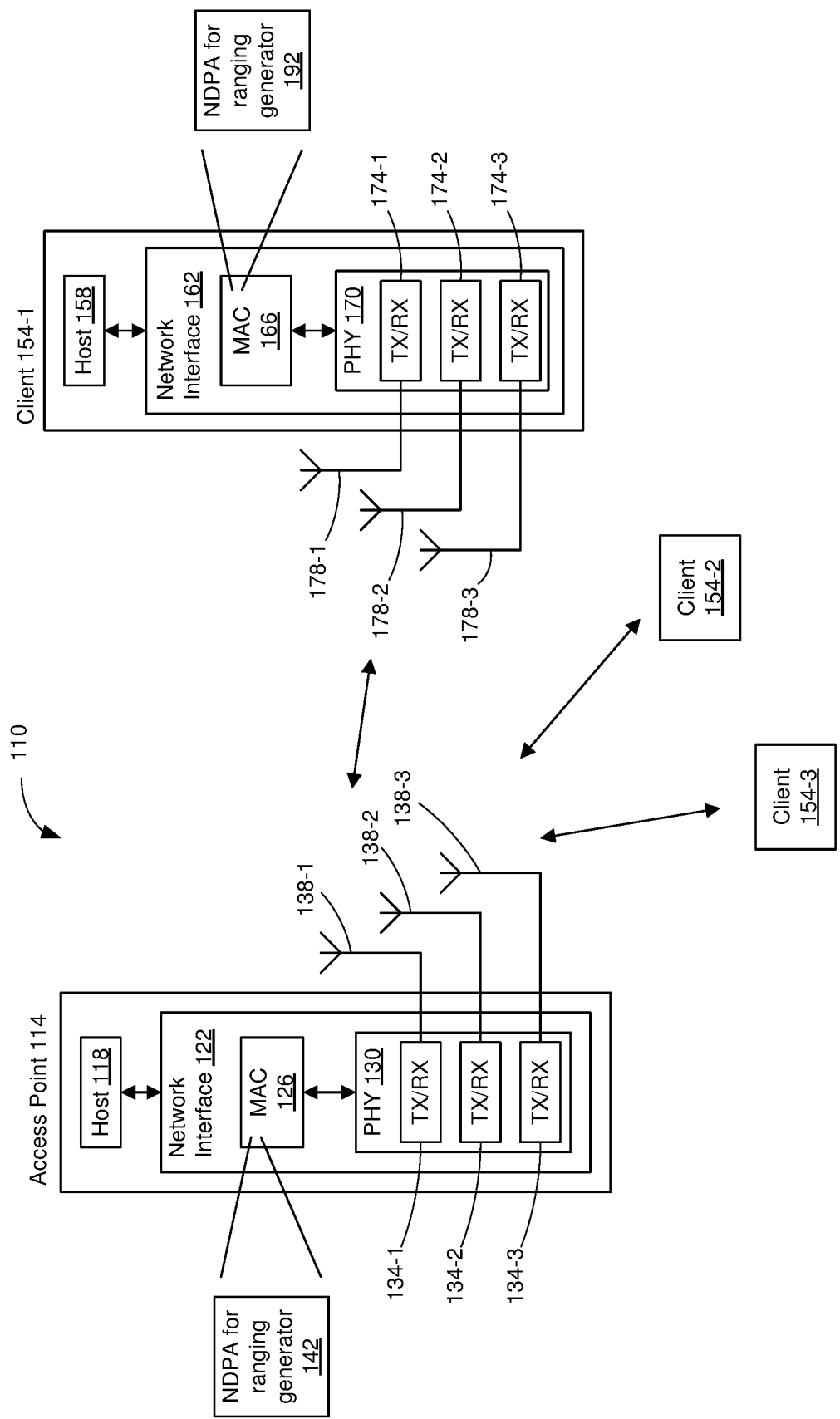
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. The PHY processor 130 is configured to receive MAC layer data units from the MAC processor 126 and encapsulate the MAC layer data units to generate PHY data units such as PHY protocol data units (PPDUs) for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In an embodiment, the MAC processor 126 includes a ranging NDPA frame generator 142 that is configured to generate NDPA frames that have information that is useful for and/or specific to a ranging measurement packet exchange, according to an embodiment. For example, the ranging NDPA frame generator 142 is configured to generate NDPA frames such as described herein. In an embodiment, the ranging NDPA frame generator 142 is implemented by a processor configured to execute machine readable instructions stored in a memory device (not shown) such as a RAM, a ROM, a flash memory, etc. In an embodiment, the ranging NDPA frame generator 142 includes a hardware state machine that is configured to generate ranging NDPA frames such as described herein.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170. The PHY processor 170 is configured to receive MAC layer data units from the MAC processor 166 and encapsulate the MAC layer data units to generate PHY data units such as PPDUs for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In an embodiment, the MAC processor 166 includes a ranging NDPA frame generator 192 that is configured to generate NDPA frames that have information that is useful for and/or specific to a ranging measurement packet exchange, according to an embodiment. For example, the ranging NDPA frame generator 192 is configured to generate NDPA frames such as described herein. In an embodiment, the ranging NDPA frame generator 192 is implemented by a processor configured to execute machine readable instructions stored in a memory device (not shown) such as a RAM, a ROM, a flash memory, etc. In an embodiment, the ranging NDPA frame generator 192 includes a hardware state machine that is configured to generate ranging NDPA frames such as described herein.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
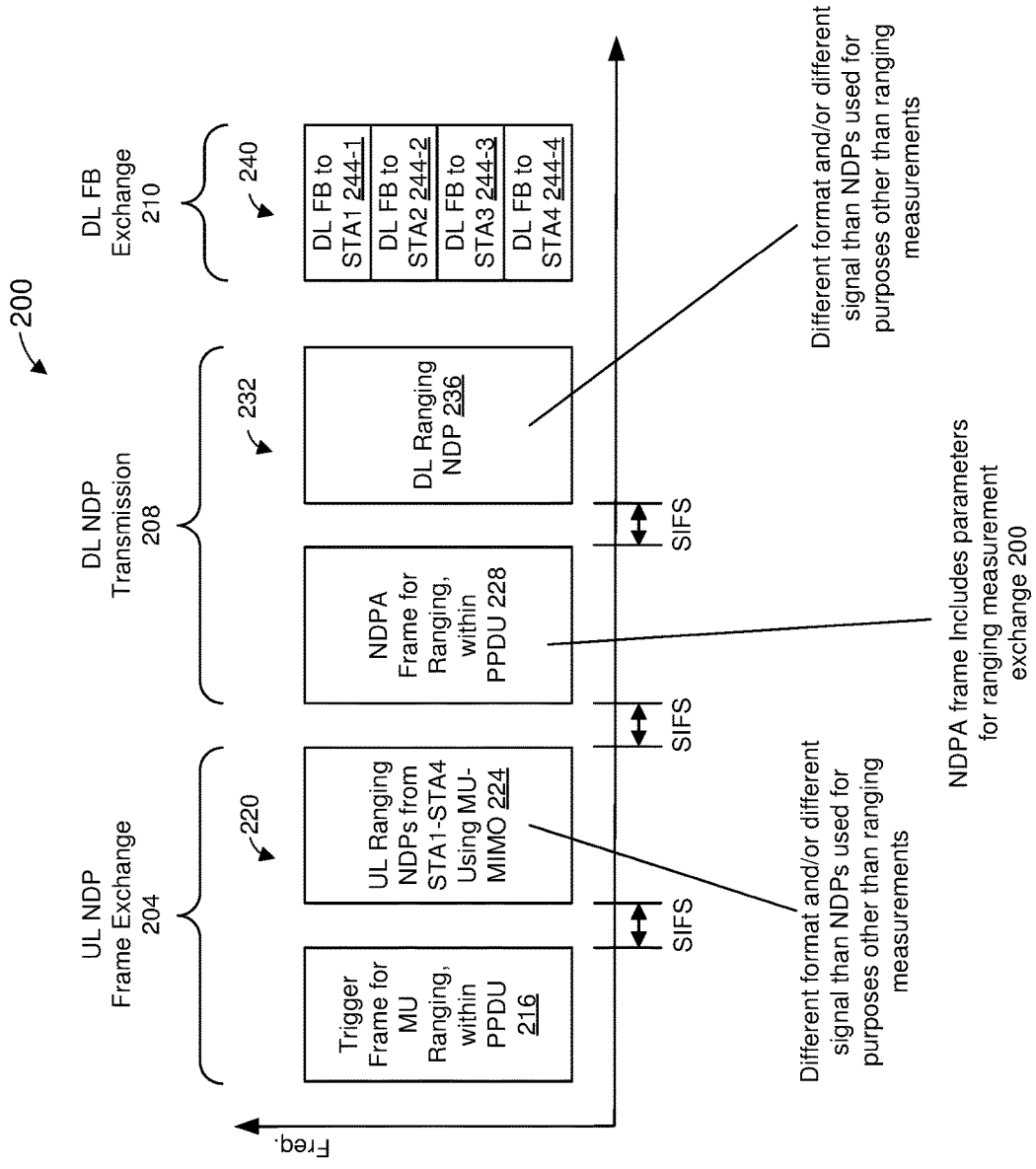
FIG. 2A is a diagram of an example trigger-based ranging measurement exchange in a multi-user (MU) ranging measurement procedure, according to an embodiment.

FIG. 2A is a diagram of an example trigger-based ranging measurement exchange 200 in a multi-user (MU) ranging measurement procedure, according to an embodiment. In another embodiment, a similar trigger-based ranging measurement exchange is employed in a single-user (SU) ranging measurement procedure.

The diagram 200 is described in the context of the example network 110 merely for explanatory purposes. In some embodiments, signals illustrated in FIG. 2A are generated by other suitable communication devices in other suitable types of wireless networks.

The trigger-based ranging measurement exchange 200 corresponds to an AP-initiated MU ranging measurement exchange, according to an embodiment, as is described in this context for explanatory purposes. In another embodiment, however, the trigger-based ranging measurement exchange 200 is between two peer communication devices and is initiated by one of the peer communication devices.

The trigger-based ranging measurement exchange 200 includes a null data packet (NDP) frame exchange 204 (e.g., an uplink (UL) NDP frame exchange), an NDP transmission portion 208 (e.g., downlink (DL) NDP transmission portion), and a feedback frame exchange 210 (e.g., a DL feedback frame exchange). In another embodiment, the trigger-based ranging measurement exchange 200 also includes a station readiness poll, which is not shown in FIG. 2A. In another embodiment, the trigger-based ranging measurement exchange 200 also includes another feedback frame exchange (e.g., an UL feedback frame exchange), which is not shown in FIG. 2A.

In the NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, NDPs 224. In an embodiment, the trigger frame in the PPDU 216 is a type of trigger frame specifically for initiating a trigger-based ranging measurement exchange. The trigger frame in the PPDU 216 causes multiple second communication devices to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more NDPs 224 from multiple second communication devices, e.g., STA1, STA2, STA3, and STA4. The two or more of the NDPs 224 are transmitted within a same frequency band via different spatial streams (e.g., MU-MIMO). In another embodiment, the UL MU transmission 220 includes an UL orthogonal frequency division multiple access (OFDMA) transmission having two or more NDPs 224 from multiple second communication devices, e.g., STA1, STA2, STA3, and STA4, in different respective frequency bandwidth portions. In yet another embodiment, three or more NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The NDPs 224 include PHY preambles having one or more short training fields (STFs), one or more long training fields (LTFs) and one or more signal fields, in an embodiment. In an embodiment, each PHY preamble of each NDP 224 includes i) a legacy portion having a legacy STF (L-STF), a legacy LTF (L-LTF), and a legacy signal field (L-SIG), and ii) a non-legacy portion having a high efficiency WiFi STF (HE-STF), one or more high efficiency WiFi LTFs (HE-LTFs), and a high efficiency WiFi signal field (HE-SIG). The NDPs 224 omit PHY data portions, in an embodiment.

In some embodiments, the NDPs 224 are ranging NDPs having a format and/or including signals that is/are particular to a ranging measurement procedure, e.g., the NDPs 224 have a format that is different than NDPs that are used for purposes other than ranging measurements, and/or includes signals that are different than NDPs that are used for purposes other than ranging measurements such as NDPs used in connection with performing channel measurements, NDPs used in connection with performing beamforming measurements, etc. Embodiments of ranging NDP(s) that are utilized for the NDPs 224 are described in more detail below.

When transmitting the NDPs 224, each second communication device records a time $t_{1,k}$ at which the second communication device began transmitting a particular portion of the NDP 224 (e.g., a particular HE-LTF in the NDP 224), where k is an index indicating the particular second communication device. Similarly, when the first communication device receives each NDP 224, the first communication device records a time $t_{2,k}$ at which the first communication device began receiving the particular portion of the NDP 224 (e.g., the particular HE-LTF in the NDP 224).

Figure 2B:
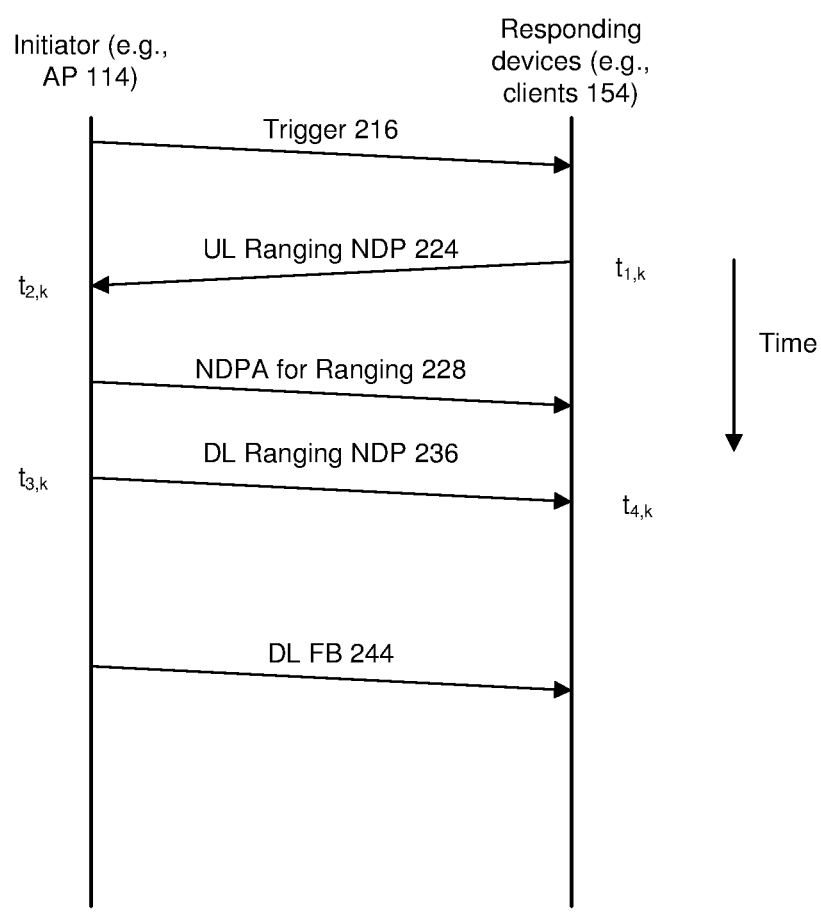
FIG. 2B is a timing diagram of the example MU ranging measurement exchange of FIG. 2A, according to an embodiment.

FIG. 2B is a timing diagram of the example trigger-based ranging measurement exchange 200 of FIG. 2A. As illustrated in FIG. 2B, each second communication device records the time $t_{1,k}$ at which the second communication device began transmitting the particular portion of the NDP 224 (e.g., the particular HE-LTF in the NDP 224). Additionally, the first communication device records the time $t_{2,k}$ at which the first communication device began receiving the respective particular portion of each NDP 224 (e.g., the particular HE-LTF in the NDP 224).

Referring now to FIGS. 2A and 2B, responsive to the UL MU transmission 220, the first communication device begins transmitting a DL PPDU 228 that includes an NDPA frame a defined time period after an end of the UL MU transmission 220. In an embodiment, the defined time period is SIFS. In other embodiments, another suitable time period is utilized.

The NDPA frame within PPDU 228 is configured to cause the second communication devices to be prepared to receive an NDP from the first communication device as part of a ranging measurement procedure, according to an embodiment. In some embodiments, the NDPA frame in the PPDU 228 includes parameters for second communication devices to use when participating in the ranging measurement exchange 200. In some embodiments, the parameters for second communication devices to use when participating in a ranging measurement exchange are not included in NDPA frames that are used for purposes other than ranging measurements, such as NDPA frames used in connection with performing channel measurements, NDPA frames used in connection with performing beamforming measurements, etc. As an illustrative example, the NDPA frame includes a parameter that indicates a number of instances of a training signal (e.g., an HE-LTF) that will be included in an NDP 236 that follows the NDPA frame, according to an embodiment. A second communication device uses such a parameter to determine how many training signals (e.g., how many HE-LTFs) in the NDP that follows the second device should process, according to an embodiment. As another illustrative example, the NDPA frame includes a parameter that indicates a number of spatial streams via which the following NDP will be transmitted to a second device, according to an embodiment. A second communication device uses such a parameter to determine which spatial streams the NDP that follows has been transmitted to the second device, according to an embodiment. Embodiments of NDPA frames for ranging measurements are described in more detail below.

The first communication device generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes NDPs 236 for respective second communication devices. In another embodiment, the first communication device transmits a single NDP 236 using a SU DL transmission. The NDP(s) 236 include PHY preamble(s) having one or more STFs, one or more LTFs and one or more signal fields, in an embodiment. In an embodiment, the PHY preamble of the NDP 236 includes i) a legacy portion having an L-STF, an L-LTF, and an L-SIG, and ii) a non-legacy portion having an HE-STF, one or more HE-LTFs, and one or more HE-SIGs. The NDP(s) 236 omit PHY data portions. In an embodiment, different NDPs 236 are transmitted in different frequency bandwidth portions (e.g., OFDMA). In some embodiments, two or more of the NDPs 236 are transmitted within a same frequency band (e.g., two or more of the NDPs 236 span the same frequency band) using different spatial streams (e.g., the two or more NDPs 236 are transmitted using MU-MIMO). In another embodiment, a single NDP 236 is broadcast to the second communication devices.

In some embodiments, the NDP(s) 236 is a ranging NDP(s) having a format and/or including signals that is/are particular to a ranging measurement procedure, e.g., the NDP(s) 236 has a format that is different than NDPs that are used for purposes other than ranging measurements, and/or includes signals that are different than NDPs that are used for purposes other than ranging measurements such as NDPs used in connection with performing channel measurements, NDPs used in connection with performing beamforming measurements, etc. Embodiments of ranging NDP(s) that are utilized for the NDP(s) 236 are described in more detail below.

When transmitting the NDP(s) 236, the first communication device records a time $t_{3,k}$ at which the first communication device began transmitting a particular portion of the NDP 236 (e.g., a particular HE-LTF in the NDP 236). Similarly, when each second communication device (e.g., client station 154) receives the corresponding NDP 236, the second communication device records a time $t_{4,k}$ at which the second communication device began receiving the particular portion of the NDP 236 (e.g., the particular HE-LTF in the NDP 236). As illustrated in FIG. 2B, the first communication device records the time $t_{3,k}$ at which the first communication device began transmitting the particular portion of the NDP 236 (e.g., the particular HE-LTF in the NDP 236), and the second communication device records the time $t_{4,k}$ at which the second communication device began receiving the particular portion of the NDP 236 (e.g., the particular HE-LTF in the NDP 236).

The DL FB exchange 210 includes a DL PPDU 240 (which may be a DL OFDMA transmission or a DL MU-MIMO transmission) having FB frames 244 for multiple second communication devices, e.g., STA1, STA2, STA3, and STA4. The FB frames 244 respectively include the recorded times $t_{2,k}$ and $t_{3,k}$. In some embodiments, the FB frames 244 optionally also include respective channel estimate information determined by the first communication device based on reception of the NDPs 224. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay.

After receipt of the FB frames 244, one or more of the second communication devices respectively calculate one or more respective of times-of-flight between the first communication device and the one or more second communication devices using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the first communication device and the second communication devices may be calculated using the calculated times-of-flight, e.g., by respectively multiplying the times-of-flight by the speed of light, according to an embodiment.

In some embodiments, one or more of the second communication devices calculate estimated positions of one or more of the second communication devices using the calculated times-of-flight. For example, the client station 154-1 uses triangulation techniques to calculate an estimated positions of the client station 154-1 using the calculated time-of-flight.

In other embodiments, the one or more of the second communication devices do not calculate estimated positions of any of the second communication devices using the calculated times-of-flight. For example, the times-of-flight are merely used for determining distances between communication devices for purposes such as determining relative proximity of communication devices, adjusting transmit power levels, etc.

In some embodiments, the second communication devices transmit uplink ranging measurement feedback packets (not shown) to the first communication device that respectively include the recorded times $t_{1,k}$ and $t_{4,k}$; and the first communication device calculates respective of times-of-flight between the first communication device and the second communication devices using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the first communication device and the second communication devices may be calculated using the calculated times-of-flight, e.g., by respectively multiplying the times-of-flight by the speed of light, according to an embodiment.

In some embodiments, the first communication device calculates estimated positions of one or more of the second communication devices using the calculated times-of-flight. For example, the first communication device uses triangulation techniques to calculate estimated positions of one or more of the second communication devices using the calculated times-of-flight.

In other embodiments, the first communication device does not calculate estimated positions of the first communication device or any of the second communication devices using the calculated times-of-flight. For example, the times-of-flight are merely used for determining distances between communication devices for purposes such as determining relative proximity of communication devices, adjusting transmit power levels, etc.

Figure 2C:
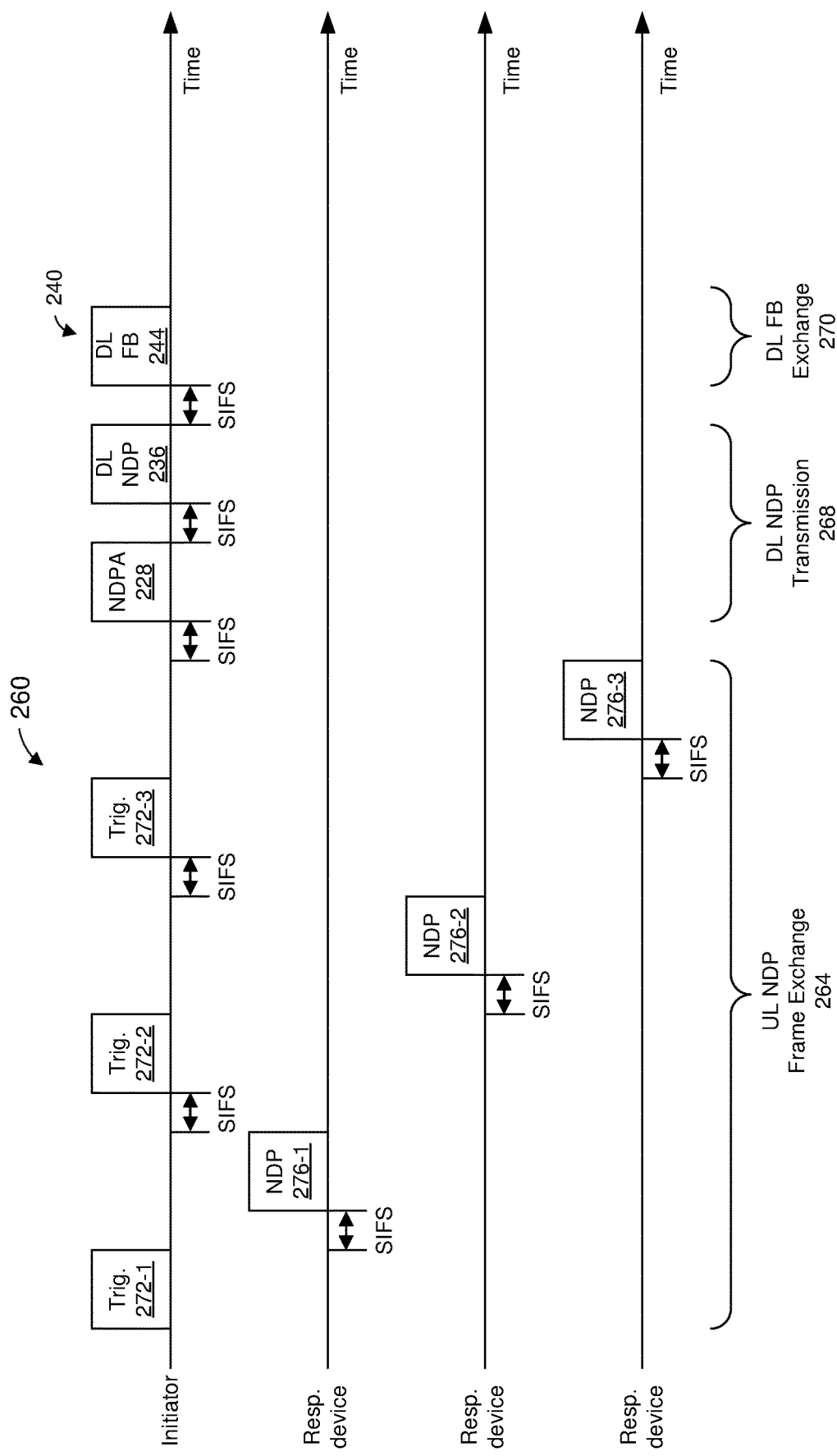
FIG. 2C is a diagram of another example trigger-based ranging measurement exchange in an MU ranging measurement procedure, according to another embodiment.

FIG. 2C is a diagram of another trigger-based ranging measurement exchange in an MU ranging measurement procedure, according to another embodiment. FIG. 2C is described in the context of the example network 110 merely for explanatory purposes. In some embodiments, signals illustrated in FIG. 2C are generated by other suitable communication devices in other suitable types of wireless networks.

The trigger-based ranging measurement exchange 260 corresponds to an AP-initiated MU ranging measurement exchange, according to an embodiment, as is described in this context for explanatory purposes. In another embodiment, however, the trigger-based ranging measurement exchange 260 is between two peer communication devices and is initiated by one of the peer communication devices.

The trigger-based ranging measurement exchange 260 includes an NDP frame exchange 264 (e.g., an UL NDP frame exchange), an NDP transmission portion 268 (e.g., a DL NDP transmission portion), and a feedback frame exchange 270 (e.g., a DL feedback frame exchange). In an embodiment, the trigger-based ranging measurement exchange 260 also includes a station readiness poll portion and/or another feedback exchange portion (e.g., an UL feedback exchange portion), which are not shown in FIG. 2C.

In the NDP exchange 264, a first communication device (e.g., the AP 114) transmits multiple DL PPDUs 272 that include respective trigger frames to cause a group of multiple second communication devices (e.g., STA1, STA2, STA3) to transmit multiple NDPs 276. In an embodiment, the trigger frames in the PPDUs 272 are a type of trigger frame specifically for prompting a second communication device to transmit an NDP as part of a MU ranging measurement exchange 260. The respective trigger frame in the respective PPDU 272 causes the respective second communication device to begin transmitting the respective NDP 276 a defined time period after an end of the PPDU 312. In an embodiment, the defined time period is SIFS as defined by the IEEE 802.11 Standard. In other embodiments, another suitable time period is utilized. In an embodiment, the first communication device transmits a subsequent PPDU 272 a defined time period after an end of reception of the previous NDP 276. In an embodiment, the defined time period is SIFS as defined by the IEEE 802.11 Standard. In other embodiments, another suitable time period is utilized.

Although FIG. 2C illustrates only one second communication device transmitting in response to each trigger frame 272, in other embodiments a respective set of multiple second communication devices transmit in UL MU transmission(s) in response to each of one or more of the trigger frames 272. In an embodiment, the first communication device selects a set of multiple second communication devices to transmit NDPs 276 in response to a single trigger frame 272 such that the receive power of the multiple NPDs 276 at the first communication device is within a suitable range. The first communication device prompts second communication devices corresponding to significantly different receive power at the first communication device (e.g., not within the suitable range) to transmit NDPs 276 at different times with different trigger frames 272, according to an embodiment.

The multiple NDPs 276 are transmitted within a same frequency band, according to an embodiment. In another embodiment, at least two NDPs 276 are transmitted in different respective frequency bandwidth portions of a communication channel. The NDPs 276 include PHY preambles having one or more STFs, one or more LTFs, and one or more signal fields, in an embodiment. In an embodiment, each NDP 276 includes i) a legacy portion having an L-STF, an L-LTF, and an L-SIG, and ii) a non-legacy portion having an HE-STF, one or more HE-LTFs, and an HE-SIG. The NDPs 276 omit data portions.

In some embodiments, the NDPs 276 are ranging NDPs having a format and/or including signals that is/are particular to a ranging measurement procedure, e.g., the NDPs 276 have a format that is different than NDPs that are used for purposes other than ranging measurements, and/or includes signals that are different than NDPs that are used for purposes other than ranging measurements such as NDPs used in connection with performing channel measurements, NDPs used in connection with performing beamforming measurements, etc. Embodiments of ranging NDP(s) that are utilized for the NDPs 276 are described in more detail below.

When a second communication device transmits the NDP 276, the second communication device records a time $t_{1,k}$ at which the second communication device began transmitting a particular portion of the NDP 276 (e.g., a particular HE-LTF in the NDP 276), where k is an index indicating the particular second communication device. Similarly, when the first communication device receives each NDP 276, the first communication device records a time $t_{2,k}$ at which the first communication device began receiving the particular portion of the NDP 276 (e.g., the particular HE-LTF in the NDP 276).

In an embodiment, responsive to receiving a last NDP 276 (e.g., the NDP 276-3), the first communication device begins transmitting the DL PPDU 228 that includes the NDPA frame a defined time period after an end of the last NDP 276 (e.g., the NDP 276-3). In an embodiment, the defined time period is SIFS. In other embodiments, another suitable time period is utilized. For example, the first communication device begins transmitting the DL PPDU 228 after a point coordination function interframe space (PIFS) as defined by the IEEE 802.11 Standard, which is longer than SIFS, according to an embodiment. As another example, if the first communication device does not receive an NDP 276 after SIFS, PIFS, or another suitable time period, after an end of transmission of the last trigger frame 272 (e.g., the trigger frame 272-3), the first communication device performs a backoff procedure prior to transmitting the DL PPDU 228.

The first communication device generates the DL PPDU 232 and begins transmitting the DL PPDU 232 a defined time period after an end of the DL PPDU 228. In an embodiment, the defined time period is SIFS. In other embodiments, another suitable time period is utilized.

Figure 3:
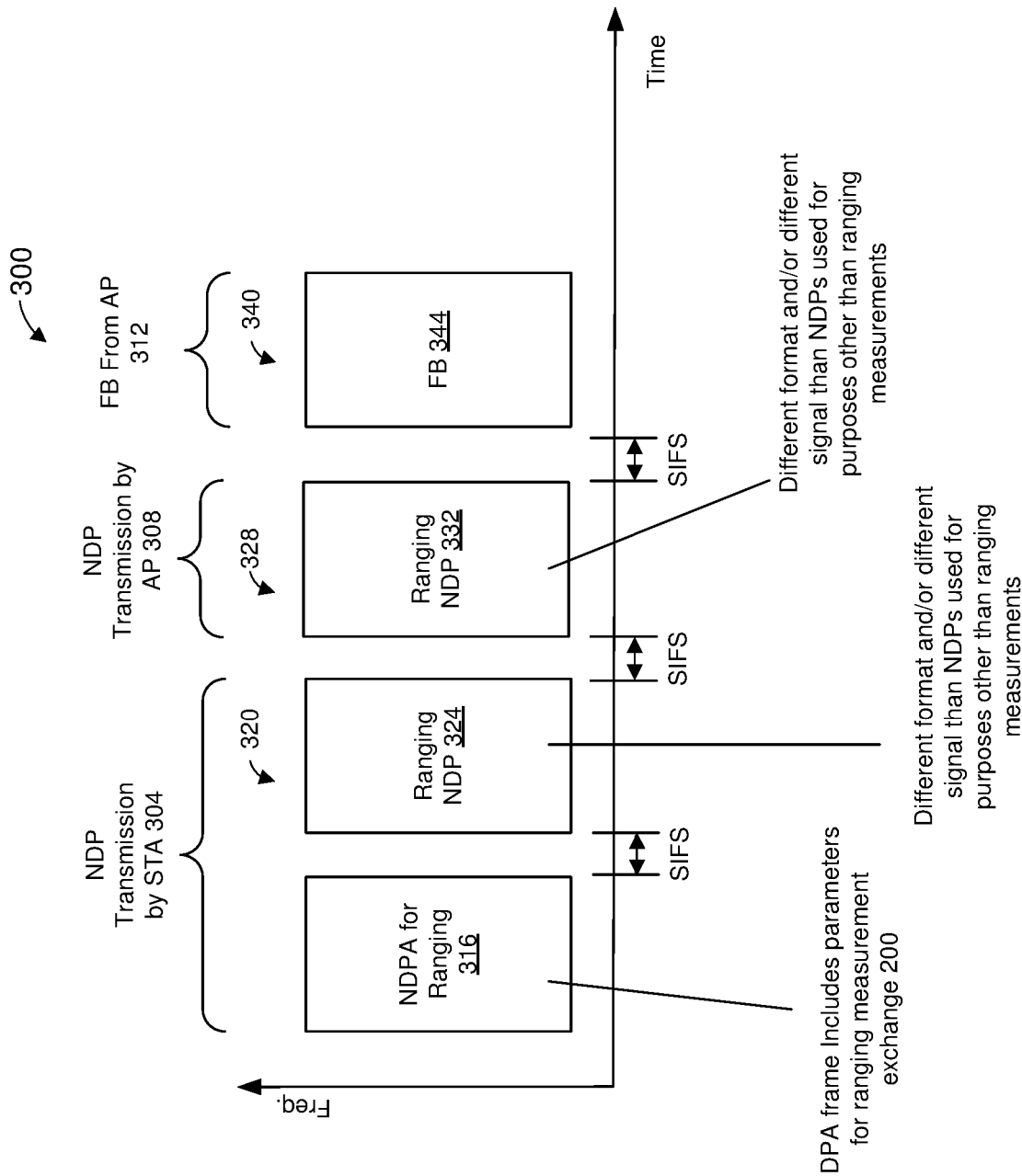
FIG. 3 is a diagram of an example non-trigger-based ranging measurement exchange in a single-user (SU) ranging measurement procedure, according to an embodiment.

FIG. 3 is a diagram of an example non-trigger-based ranging measurement exchange 300 in a single-user (SU) ranging measurement procedure, according to an embodiment. In another embodiment, a similar non-trigger-based ranging measurement exchange is employed in an MU ranging measurement procedure.

The diagram 300 is described in the context of the example network 110 merely for explanatory purposes. In some embodiments, signals illustrated in FIG. 3 are generated by other suitable communication devices in other suitable types of wireless networks.

The non-trigger-based ranging measurement exchange 300 corresponds to a station-initiated SU ranging measurement exchange with an AP, according to an embodiment, as is described in this context for explanatory purposes. In another embodiment, however, the non-trigger-based ranging measurement exchange 300 is between two peer communication devices and is initiated by one of the peer communication devices. In another embodiment, the non-trigger-based ranging measurement exchange 300 corresponds to an AP-initiated SU ranging measurement exchange with a client station.

The non-trigger-based ranging measurement exchange 300 includes an NDP exchange 304, an NDP transmission portion 308, and a feedback frame exchange 312. In another embodiment, the non-trigger-based ranging measurement exchange 300 also includes another feedback frame exchange (e.g., feedback from the first communication device to the second communication device), which is not shown in FIG. 3.

In the NDP exchange 304, a first communication device (e.g., the client station 154) transmits a PPDU 316 that includes an NDPA frame. The NDPA frame in the PPDU 316 is configured to cause a second communication devices to be prepared to receive an NDP from the first communication device as part of a ranging measurement procedure, according to an embodiment. In some embodiments, the NDPA frame in the PPDU 316 includes parameters for the second communication device to use when participating in the ranging measurement exchange 300. Embodiments of NDPA frames for ranging measurements are described in more detail below.

The first communication device generates a PPDU 320 and begins transmitting the PPDU 320 a defined time period after an end of the PPDU 316. In an embodiment, the defined time period is SIFS. In other embodiments, another suitable time period is utilized. The PPDU 324 is an SU PPDU that includes an NDP(s) 324 for the second communication device. The NDP(s) 324 include PHY preamble(s) having one or more STFs, one or more LTFs and one or more signal fields, in an embodiment. In an embodiment, the PHY preamble of the NDP 324 includes i) a legacy portion having an L-STF, an L-LTF, and an L-SIG, and ii) a non-legacy portion having an HE-STF, one or more HE-LTFs, and one or more HE-SIGs. The NDP(s) 324 omit PHY data portions. In an embodiment in which multiple NDPs 324 are transmitted, the different NDPs 324 are transmitted in different frequency bandwidth portions (e.g., OFDMA). In some embodiments in which multiple NDPs 324 are transmitted, two or more of the NDPs 324 are transmitted within a same frequency band (e.g., two or more of the NDPs 324 span the same frequency band) using different spatial streams (e.g., the two or more NDPs 324 are transmitted using MU-MIMO).

In some embodiments, the NDP(s) 324 is a ranging NDP(s) having a format and/or including signals that is/are particular to a ranging measurement procedure, e.g., the NDP(s) 324 has a format that is different than NDPs that are used for purposes other than ranging measurements, and/or includes signals that are different than NDPs that are used for purposes other than ranging measurements such as NDPs used in connection with performing channel measurements, NDPs used in connection with performing beamforming measurements, etc. Embodiments of ranging NDP(s) that are utilized for the NDP(s) 324 are described in more detail below.

When transmitting the NDP(s) 324, the first communication device records a time $t_1$ at which the first communication device began transmitting a particular portion of the NDP 324 (e.g., a particular HE-LTF in the NDP 324). Similarly, when the second communication device (e.g., AP 114) receives the NDP 324, the second communication device records a time $t_2$ at which the second communication device began receiving the particular portion of the NDP 324 (e.g., the particular HE-LTF in the NDP 324).

In an embodiment, responsive to receiving the NDP 324, the second communication device begins transmitting a PPDU 328 that includes a defined time period after an end of the last NDP 324. In an embodiment, the defined time period is SIFS. In other embodiments, another suitable time period is utilized. In an embodiment, the NDP 328 includes an NDP(s) 332. The NDP(s) 332 includes a PHY preamble having one or more STFs, one or more LTFs, and one or more signal fields, in an embodiment. In an embodiment, each PHY preamble of the NDP 332 includes i) a legacy portion having an L-STF, an L-LTF, and an L-SIG, and ii) a non-legacy portion having an HE-STF, one or more HE-LTFs, and an HE-SIG. The NDP(s) 332 omits PHY data portions, in an embodiment.

In some embodiments, the NDP(s) 332 is a ranging NDP having a format and/or including signals that is/are particular to a ranging measurement procedure, e.g., the NDP(s) 332 has a format that is different than NDPs that are used for purposes other than ranging measurements, and/or includes signals that are different than NDPs that are used for purposes other than ranging measurements such as NDPs used in connection with performing channel measurements, NDPs used in connection with performing beamforming measurements, etc. Embodiments of ranging NDP(s) that are utilized for the NDP(s) 332 are described in more detail below.

When transmitting the NDP 332, the second communication device records a time $t_3$ at which the second communication device began transmitting a particular portion of the NDP 332 (e.g., a particular HE-LTF in the NDP 332. Similarly, when the first communication device receives the NDP 332, the first communication device records a time $t_4$ at which the first communication device began receiving the particular portion of the NDP 332 (e.g., the particular HE-LTF in the NDP 332).

The FB exchange 312 includes a PPDU 340 having a FB frame 344. In some embodiments, the PPDU 340 is transmitted a defined time period after an end of the PPDU 328. In an embodiment, the defined time period is SIFS. In other embodiments, another suitable time period is utilized. In other embodiments, the PPDU 340 is transmitted after some delay.

The FB frame 344 includes the recorded times $t_2$ and $t_3$. In some embodiments, the FB frame 344 optionally also include respective channel estimate information determined by the second communication device based on reception of the NDP 332.

After receipt of the FB frames 344, the first communication device calculates a time-of-flight between the first communication device and the second communication device using the recorded times $t_1$, $t_2$, $t_3$, and $t_4$, according to an embodiment. Any suitable technique, including currently known techniques, may be utilized to calculate a time-of-flight using the recorded times $t_1$, $t_2$, $t_3$, and $t_4$. A distance between the first communication device and the second communication device may be calculated using the calculated time-of-flight, e.g., by multiplying the time-of-flight by the speed of light, according to an embodiment.

In some embodiments, the first communication device calculates an estimated position of the first communication device and/or an estimated position of the second communication device using the calculated time-of-flight. For example, the first communication device uses triangulation techniques to calculate an estimated position of the first communication device and/or an estimated position of the second communication device using the calculated time-of-flight.

In some embodiments, the first communication device transmits a ranging measurement feedback packet (not shown) to the second communication device that includes the recorded times $t_1$ and $t_4$; and the second communication device calculates a time-of-flight between the first communication device and the second communication devices using the recorded times $t_1$, $t_2$, $t_3$, and $t_4$, according to an embodiment. Any suitable technique, including currently known techniques, may be utilized to calculate a time-of-flight using the recorded times $t_1$, $t_2$, $t_3$, and $t_4$. A distance between the first communication device and the second communication device may be calculated using the calculated time-of-flight, e.g., by multiplying the time-of-flight by the speed of light, according to an embodiment.

In some embodiments, the second communication device calculates an estimated position of the first communication device and/or an estimated position of the second communication device using the calculated time-of-flight. For example, the second communication device uses triangulation techniques to calculate an estimated position of the first communication device and/or an estimated position of the second communication device using the calculated time-of-flight.

FIG. 4A is a diagram of an example prior art NDP 400 that generally corresponds to an NDP defined by the IEEE 802.11ax (HE) Standard. The NDP 400 includes a legacy portion 404 having a legacy short training field (L-STF) 408, a legacy long training field (L-LTF) 412, and a legacy signal field (L-SIG) 416.

The L-STF 408 includes a signal (e.g., a training signal) that is configured to permit a wireless receiver to perform one or more functions such as i) packet detection, ii) initial synchronization, and iii) automatic gain control (AGC) adjustment. In an embodiment, the L-LTF 412 includes a signal (e.g., a training signal) that is configured to permit the wireless receiver to perform one or more functions such as i) channel estimation and ii) fine synchronization. The contents of the L-STF 408 and the L-LTF 412 are defined by a communication protocol and are the same for every packet.

The L-SIG 416 includes PHY information, such as i) a rate subfield, and ii) a length subfield. Contents of the rate subfield and the length subfield are set to indicate a duration of NDP 400 so that legacy communication devices are able to at least determine a duration of the NDP 400.

The NDP 400 also includes another instance of the L-SIG 416, referred to as a repeated L-SIG (RL-SIG) 420. The NDP 400 also includes a high efficiency WiFi signal field (HE-SIG-A) 424 that generally carries information about a format of the NDP 400 within subfields, such as a subfield that specifies number of spatial streams via which the NDP 400 is transmitted, a subfield that specifies a bandwidth of the NDP 400, a subfield that specifies i) a duration of training fields in the NDP 400 and ii) a duration of a guard interval (GI) included with each of the training fields, etc.

A high efficiency WiFi short training field (HE-STF) 428 includes a signal that is configured to permit the wireless receiver to perform a function such as AGC refinement. High efficiency WiFi long training fields (HE-LTFs) 432 include signals that are configured to permit the wireless receiver to perform a function such as channel estimation for a multiple input, multiple output (MIMO) channel that employs multiple spatial streams. In an embodiment, a number (N) of HE-LTFs 432 in the NDP 400 corresponds to a number of spatial streams (specified in HE-SIG-A 424) via which the NDP 400 is transmitted. In an embodiment, a duration of each of the HE-LTFs 432 and a guard interval duration used with each of the HE-LTFs 432 is specified in HE-SIG-A 424.

As discussed above, training signals such as HE-LTFs 432 are used to determine times of receipt of an NDP during a ranging measurement procedure, according to an embodiment. Also as discussed above, times of transmission of an NDP are determined with reference to training signals such as HE-LTFs 432 during a ranging measurement procedure, according to an embodiment. When the NDP 400 is used for non-ranging purposes, such as channel estimation or beamforming training, a receiver device uses the HE-LTFs 432 for non-ranging purposes, such as to determine a channel estimate, for example.

In an embodiment, the NDP 400 optionally includes a packet extension field (PE) 436 that includes arbitrary information that need not be processed by a receiver device. The PE 436 provides a receiver device with additional time to process the HE-LTFs 432 prior to transmitting a subsequent packet a defined time period (e.g., SIFS) after an end of reception of the NDP 400. For example, in a ranging measurement exchange such as discussed with reference to FIGS. 2A-C and 3, a communication device will need to transmit a packet a defined time period (e.g., SIFS) after an end of reception of an NDP, such as an NDPA frame, a ranging feedback frame, another NDP, etc.

Each of the L-STF 408, the L-LTF 412, the L-SIG 416, the RL-SIG 420, the HE-SIG-A 424, the VHT-STF 428, and the N VHT-LTFs 432, and the PE 436 comprises one or more orthogonal frequency division multiplexing (OFDM) symbols. As merely an illustrative example, the HE-SIG-A 424 comprises two OFDM symbols.

In the illustration of FIG. 4A, the NDP 400 includes one of each of the L-STF 408, the L-LTF 412, the L-SIG 416, the RL-SIG 420, and the HE-SIG-A 424. When an NDP 400 spans a cumulative bandwidth that includes multiple subchannels (e.g., multiple 20 MHz subchannels), each of the L-STF 408, the L-LTF 412, the L-SIG 416, the RL-SIG 420, and the HE-SIG-A 424 is repeated over a corresponding number of subchannels (e.g., 20 MHz subchannels) of the whole bandwidth of the packet, in an embodiment. For example, in an embodiment in which the NDP 400 occupies an 80 MHz bandwidth, NDP 400 includes four of each of the L-STF 408, the L-LTF 412, the L-SIG 416, the RL-SIG 420, and the HE-SIG-A 424. The HE-STF 428 and the HE-LTFs 432 are generated to span the entire cumulative bandwidth of the NDP 400.

Figure 4B:
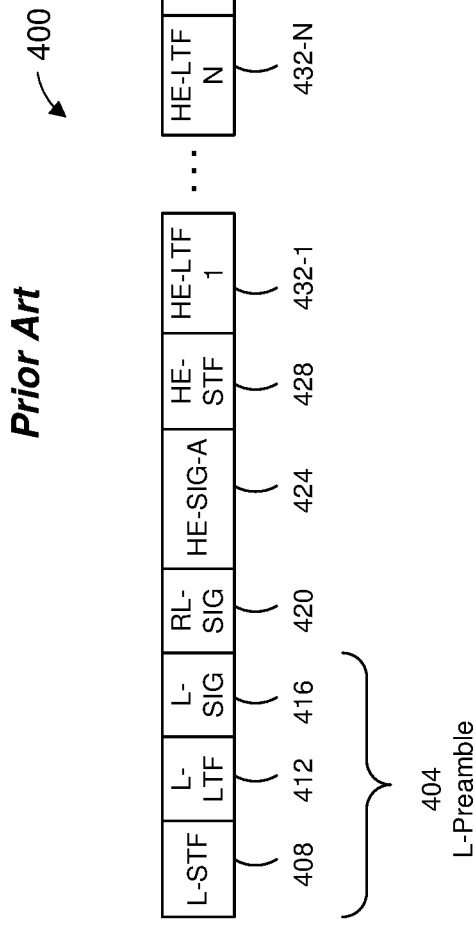
FIG. 4B is a diagram of an example NDP format for use in a ranging measurement procedure, according to an embodiment.
Figure 4B:
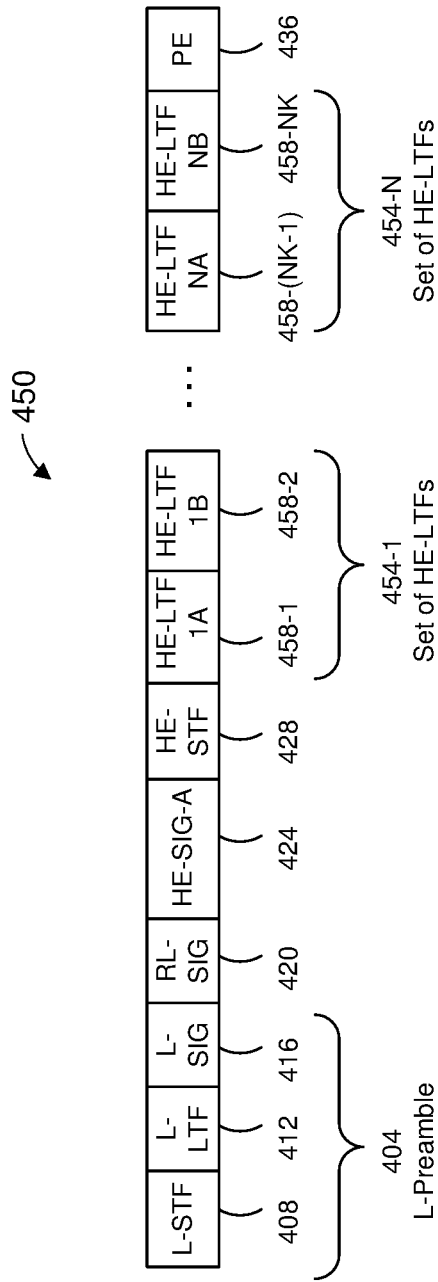

FIG. 4B is a diagram of an example ranging NDP 450 that the network interface 122 (FIG. 1) is configured to generate and transmit to a client station 154 (e.g., the client station 154-1) as part of a ranging measurement exchange, according to an embodiment. The network interface 162 (FIG. 1) is also configured to transmit NDPs the same as or similar to the ranging NDP 450 to the AP 114 or another client station 154 as part of a ranging measurement exchange. The NDP 450 occupies a single subchannel (e.g., a 20 MHz bandwidth subchannel or another suitable bandwidth subchannel). NDPs similar to the ranging NDP 450 occupy other suitable bandwidths such as 1 MHz, 2 MHz, 5 MHz, 10 MHz, 40 MHz, 80 MHz, 160 MHz, 320 MHz, 640 MHz, for example, in other embodiments.

In various embodiments, the NDP 450 (or a similar NDP) is used in one or more of the example ranging measurement exchanges described with reference to FIGS. 2A-C and 3, or is used in another suitable ranging measurement exchange.

The ranging NDP 450 includes some of the same elements as the NDP 400 of FIG. 4A, and elements with the same reference number are not discussed in detail for purposes of brevity.

The ranging NDP 450 includes N sets 454 of HE-LTFs, where each set 454 includes K instances of an HE-LTF 458, where K is a suitable positive integer. Thus, when K is greater than one, each set 454 include multiple instances of an HE-LTF 458. In FIG. 4B, two HE-LTFs 458 (i.e., K=2) are included in each set 454 merely to show an illustrative example. In other scenarios only one HE-LTF 458 is included in each set 454, or more than two HE-LTFs 458 are included in each set 454.

During a ranging measurement procedure, the use of multiple instances of an HE-LTF 458 in each set 454 improves times of receipt estimates especially when a signal-to-noise ratio (SNR) and/or a signal to interference plus noise ratio (SINR) is relatively low, and/or a received signal strength is relatively low. If channel estimates are also determined during the ranging measurement procedure, the use of multiple instances of an HE-LTF 458 in each set 454 improves accuracy of the channel estimates, especially when a signal-to-noise ratio (SNR) and/or a signal to interference plus noise ratio (SINR) is relatively low. Thus, in some embodiments, K is set to one when channel conditions are relatively good (e.g., SNR and/or SINR are relatively high, and/or a received signal strength is relatively high), whereas K is set to two, three, etc., when channel conditions are relatively poor (e.g., SNR and/or SINR are relatively low, and/or a received signal strength is relatively low).

As will be described in more detail below, the first communication device (and/or a transmitter of the NDP 450) chooses a value of the parameter K (for NDPs to be transmitted by the first communication device and/or for NDPs to be transmitted by the second communication device(s)), and informs the second communication device(s) (and/or the recipient(s) of the NPD 450) of the value of the parameter K, in some embodiments. In some embodiments, the first communication device informs the second communication device(s) of the parameter K (sometimes referred to herein as a "training signal repetition parameter") by including the parameter K in an NDPA, such as the NDPA 228 (FIGS. 2A and 2C) or the NDPA 316 (FIG. 3).

The HE-LTFs 458 include signals that are configured to permit the wireless receiver to perform a function such as channel estimation for a MIMO channel that employs multiple spatial streams. In an embodiment, the number, N, of sets 454 of HE-LTFs 458 in the NDP 450 corresponds to a number of spatial streams (specified in HE-SIG-A 424) via which the NDP 450 is transmitted. In an embodiment, each set 454 of HE-LTFs 458 is transmitted via a respective spatial stream. For example, set 454-1 is transmitted via a first spatial stream, set 454-2 is transmitted via a second spatial stream, and so on.

As discussed above, the HE-LTFs 458 are used to determine times of receipt of the NDP 450 during a ranging measurement procedure, according to an embodiment. Also as discussed above, times of transmission of the NDP 450 are determined with reference to training signals such as the HE-LTFs 458 during a ranging measurement procedure, according to an embodiment.

In an embodiment, a duration of each of the HE-LTFs 458 and a guard interval duration used with each of the HE-LTFs 458 is specified in the HE-SIG-A 424.

In an embodiment, to defend against replay attacks in which a HE-LTF (or a portion thereof) is copied and then retransmitted with a time-advance with respect to HE-LTFs in the NDP 450, HE-LTFs in the ranging NDP 450 use different training field signals in different NDPs 450, unlike HE-LTFs in data packets and non-ranging measurement NDPs such as the NDP 400 of FIG. 4A, where each HE-LTF uses the same training field signal in each NDP.

In an embodiment, the first communication device (and/or the transmitter of the ranging NDP 450) informs a second communication device (and/or an intended receiver of the NDP 450), e.g., prior to transmitting the NDP 450 or after transmitting the HE-LTFs 450, of the training field signals that will be (or were) used for HE-LTF(s) 458 in the NDP 450. Thus, when the NDP 450 is transmitted, the training field signal(s) used for HE-LTF(s) 458 in the NDP 450 are unknown to the attacker, whereas the intended receiver knows the training field signal(s) that are used for HE-LTF(s) in the NDP 450 (or will subsequently know). In an embodiment, the first communication device (and/or the transmitter of the ranging NDP 450) conveys training field signal identification information to the second communication device (and/or an intended receiver of the NDP 450) in a secure manner such that the attacker cannot determine ahead of time the training field signal(s) that will be used for the HE-LTF(s) 458 in the NDP 450.

In an embodiment, the first communication device (and/or the transmitter of the ranging NDP 450) informs a second communication device (and/or an intended receiver of the NDP 450), e.g., prior to transmitting the NDP 450 or after transmitting the HE-LTFs 450, of an ordered sequence of training signals that will be used in the NDP 450 and optionally with one or more additional NDPs 450 that will subsequently transmitted. To facilitate the first communication device and the second communication device(s) remaining synchronized as to which training sequence signals will be included in any particular NDP 450, a synchronization parameter (sometimes referred to as a secure authentication code (SAC)) is communicated between communication devices participating in a ranging measurement exchange, according to an embodiment. As will be described in more detail below, the first communication device (and/or a transmitter of the NDP 450) determines a value of the synchronization parameter (e.g., the SAC), and informs the second communication device(s) (and/or the recipient(s) of the NPD 450) of the value of the synchronization parameter, in some embodiments. In some embodiments, the first communication device informs the second communication device(s) of the synchronization parameter (e.g., the SAC) by including the synchronization parameter in an NDPA, such as the NDPA 228 (FIGS. 2A and 2C) or the NDPA 316 (FIG. 3).

In the illustration of FIG. 4B, the NDP 450 includes one of each of the L-STF 408, the L-LTF 412, the L-SIG 416, the RL-SIG 420, and the HE-SIG-A 424. When an NDP 450 spans a cumulative bandwidth that includes multiple sub-channels (e.g., multiple 20 MHz subchannels), each of the L-STF 408, the L-LTF 412, the L-SIG 416, the RL-SIG 420, and the HE-SIG-A 424 is repeated over a corresponding number of subchannels (e.g., 20 MHz subchannels) of the whole bandwidth of the packet, in an embodiment. For example, in an embodiment in which the NDP 450 occupies an 80 MHz bandwidth, NDP 400 includes four of each of the L-STF 408, the L-LTF 412, the L-SIG 416, the RL-SIG 420, and the HE-SIG-A 424. The HE-STF 428 and the HE-LTFs 458 are generated to span the entire cumulative bandwidth of the NDP 450.

Figure 4C:
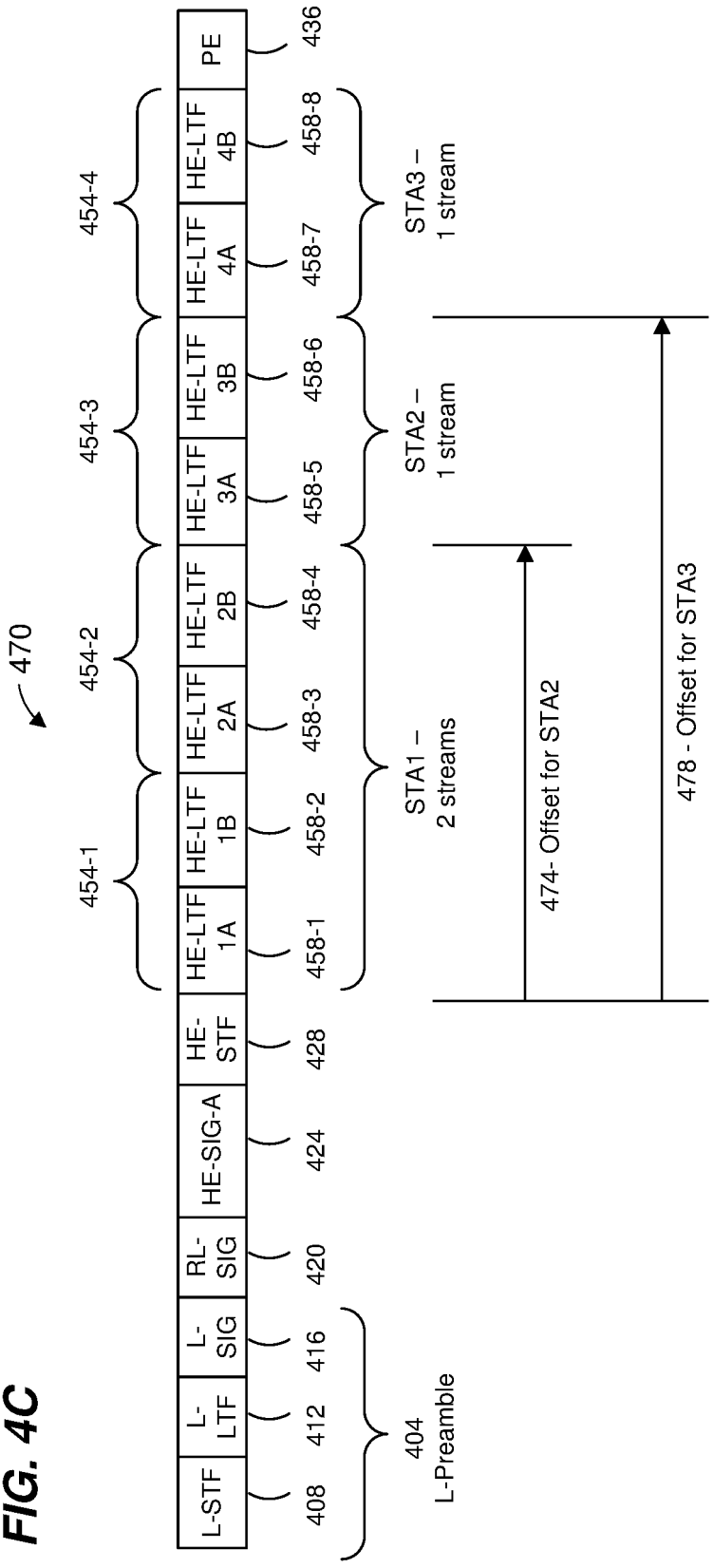
FIG. 4C is a diagram of another example NDP format for use in a ranging measurement procedure, according to another embodiment.

In some embodiments in which the NDP 450 is transmitted to multiple communication devices, each communication device is informed only of the training sequence signals that will be used in HE-LTFs 458 corresponding to that communication device. FIG. 4C is a diagram illustrating a more specific example 470 of the NDP 450 of FIG. 4B, according to an embodiment. In the example of FIG. 4C, the parameter K is two, and the NDP 470 is intended for three communication devices (STA1, STA2, STA3). The NDP 470 is transmitted via two spatial streams to STA1, via one spatial stream to STA2, and via one spatial stream to STA3. Thus, HE-LTFs 458-1 to 458-4 correspond to STA1, HE-LTFs 458-5 and 458-6 correspond to STA2, and HE-LTFs 458-7 and 458-8 correspond to STA3. HE-LTFs 458 for STA2 begin after an offset 474 from HE-STF 428. Similarly, HE-LTFs 458 for STA3 begin after an offset 478 from HE-STF 428. In some embodiments, the first communication device informs a second communication device of an offset parameter so that the second device can use the offset parameter to determine when HE-LTFs 458 corresponding to the second communication device occur in the NDP 470. In an embodiment, the first communication device informs a second communication device of an offset parameter by including the offset parameter in an NDPA, such as the NDPA 228 (FIGS. 2A and 2C) or the NDPA 316 (FIG. 3).

Figure 5A:
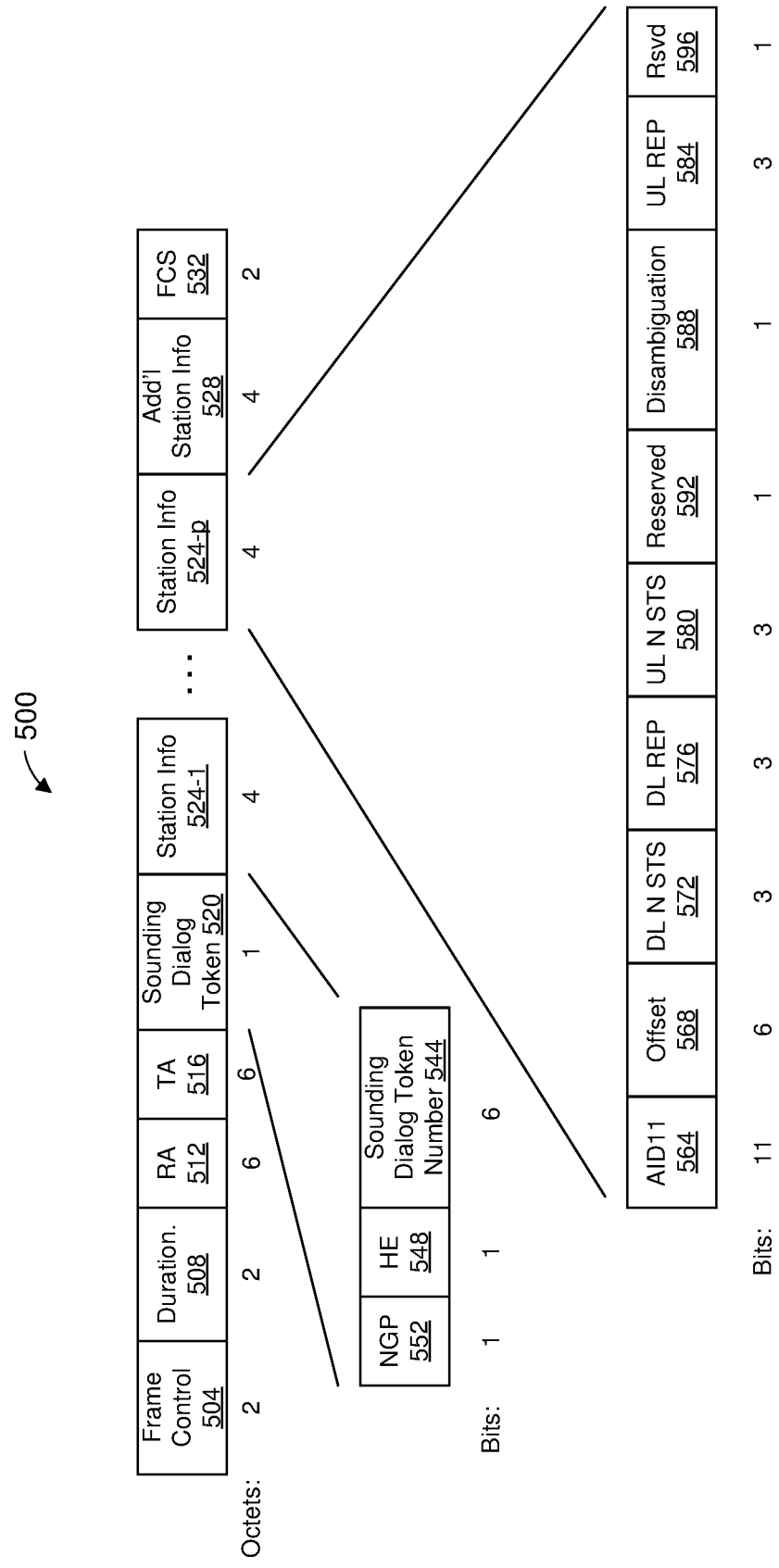
FIG. 5A is a diagram of an example NDP announcement (NDPA) frame for use in a ranging measurement exchange, according to an embodiment.

FIG. 5A is a diagram of an example NDPA frame 500 for ranging that the network interface 122 (FIG. 1) is configured to generate and transmit to one or more client stations 154 (e.g., the client station 154-1) as part of a ranging measurement exchange, according to an embodiment. The network interface 162 (FIG. 1) is also configured to transmit NDPA frame 500 to the AP 114 or another client station 154 as part of a ranging measurement exchange. For example, a PHY data unit (e.g., a PPDU) that includes the NDPA frame 500 is generated, and the PHY data unit is transmitted as part of a ranging measurement exchange.

In various embodiments, the NDPA frame 500 (or a similar NDPA frame) is used in one or more of the example ranging measurement exchanges described with reference to FIGS. 2A-C and 3, or is used in another suitable ranging measurement exchange. For example, the NDPA frame 500 is used for the NDPA frame 228 (FIGS. 2A and C) and/or for the NDPA frame 316 (FIG. 3), according to various embodiments.

FIG. 5A illustrates example lengths of fields and subfields. In other embodiments, however, one or more of the fields or subfields illustrated in FIG. 5A has another suitable length(s). Although FIG. 5A illustrates example arrangements of fields and subfields, the fields and/or subfields are suitably arranged differently in other embodiments.

The NDPA frame 500 includes a frame control field 504 set to a value that indicates the frame 500 is an NDPA frame. A duration field 508 is set to a value that indicates a time duration of the NDPA frame 500 or a transmit opportunity period (TXOP) within which the NDPA frame 500 is transmitted.

The NDPA frame 500 includes a receiver address (RA) field 512 set to a network address (e.g., a MAC address or another suitable network address) of an intended recipient or recipients of the NDPA frame 500. In some embodiments, the RA field 512 is set to a network address of a single communication device. In some embodiments, the RA field 512 is set to a broadcast address that indicates the NDPA frame 500 is intended for all communication devices in a wireless network. In some embodiments, the RA field 512 is set to a group address corresponding to a group of multiple communication devices.

The NDPA frame 500 also includes a transmitter address (TA) field 516 set to a network address (e.g., a MAC address or another suitable network address) of the communication device that is transmitting the NDPA frame 500, according to an embodiment. In some embodiments, the TA field 516 is set to a reserved address that does not correspond to any particular communication device.

The NDPA frame 500 includes a sounding dialog token field 520 that includes information that identifies the NDPA frame 500 to distinguish the NDPA frame 500 from another NDPA frame transmitted at a different time. In some embodiments, the sounding dialog token field 520 also includes information that indicates a format of the NDPA frame 500, as will be discussed in more detail below.

The NDPA frame 500 also includes one or more station information fields 524. Each station information field 524 corresponds to a respective intended receiver of the NDPA frame 500 (e.g., a respective participant in a ranging measurement exchange) and includes information specific to the intended receiver of the NDPA frame 500. The station information fields 524 will be discussed in more detail below.

The NDPA frame 500 also includes an additional station information field 528 that includes information for all intended receivers of the NDPA frame 500 (e.g., one or more participants in the ranging measurement exchange). For example, the additional station information field 528 includes a synchronization parameter (e.g., an SAC as described above) for the ranging measurement exchange, according to an embodiment. The additional station information field 528 will be discussed in more detail below.

The NDPA frame 500 further includes a frame check sequence (FCS) field 532 that includes error detection information for use by a recipient of the NDPA frame 500 to determine if any of the fields of the NDPA frame 500 were received in error, according to an embodiment.

Referring again to the sounding dialog token field 520, the sounding dialog token field 520 includes a subfield 544 having a sounding dialog token number that identifies the NDPA frame 500 to distinguish the NDPA frame 500 from another NDPA frame transmitted at a different time. The NDPA frame 500 uses the same information in the frame control field 504 as legacy NDPA frames that identifies the NDPA frame 500 as an NDPA frame, but has a format that is different than legacy NDPA frames. Thus, the sounding dialog token field 520 includes information that indicates the format of the NDPA frame 500. For example, the sounding dialog token field 520 includes a subfield 548 and a subfield 552 set to indicate the format of the NDPA frame 500. For example, the subfield 548 is set consistent with an NDPA frame defined by the IEEE 802.11ax Standard, and the subfield 552 is set differently from the NDPA frame defined by the IEEE 802.11ax Standard to distinguish the NDPA frame 500 from the NDPA frame defined by the IEEE 802.11ax Standard and to indicate the NDPA frame 500 is for a ranging measurement exchange. A communication device that receives the NDPA frame 500 analyzes the subfield 548 and the subfield 552 to determine that the NDPA frame 500 has a format as illustrated in FIG. 5A and is for a ranging measurement exchange.

Referring again to the station information fields 524, each station information field 524 includes an association identifier (AID) subfield 564 that includes at least a portion of an AID of an intended recipient of the NDPA frame 500. In an embodiment, the AID is a shortened network address (e.g., a MAC address) of an intended recipient of the NDPA frame 500. A communication device that receives the NDPA frame 500 analyzes the AID subfield(s) 564 in one or more station information fields 524 to identify a station information field 524 that corresponds to the communication device, if any.

Each station information field 524 also includes an offset subfield 568. The offset subfield 568 includes a value that indicates an offset, from a first occurring HE-LTF within a set of all HE-LTFs in an NDP that follows the NDPA frame 500, for HE-LTFs in the NDP that correspond to a communication device identified by the AID subfield 564. Referring again to FIG. 4C as an illustrative example, if the AID subfield 564 identifies STA1, the offset subfield 568 is set to indicate an offset of zero (i.e., HE-LTFs 458 corresponding to STA1 begin with the first occurring HE-LTF 458); if the AID subfield 564 identifies STA2, the offset subfield 568 is set to indicate an offset of four HE-LTF (i.e., HE-LTFs 458 corresponding to STA2 begin with a fifth occurring HE-LTF 458); and if the AID subfield 564 identifies STA3, the offset subfield 568 is set to indicate an offset of six HE-LTFs (i.e., HE-LTFs 458 corresponding to STA3 begin with a seventh occurring HE-LTF 458).

A downlink number of spatial streams (DL N STS) subfield 572 indicates a number spatial streams via which a subsequent NDP will be transmitted to the communication device identified by the AID subfield 564. The DL N STS subfield 572 informs the communication device identified by the AID subfield 564 of how many groups 454 (FIGS. 4A and 4C) of HE-LTFs correspond to the communication device, according to an embodiment. A downlink repetition (DL REP) field (sometimes referred to herein as a "DL training signal repetition field") 576 indicates a number instances of HE-LTFs that will be included, in a subsequent NDP, in each group 454 of HE-LTFs (FIGS. 4A and 4C) corresponding to the communication device identified by the AID subfield 564.

An uplink number of spatial streams (UL N STS) subfield 580 indicates a number spatial streams via which the communication device identified by the AID subfield 564 should transmit an NDP to the first device. The UL N STS subfield 580 informs the communication device identified by the AID subfield 564 of how many groups 454 (FIGS. 4A and 4C) of HE-LTFs the communication device should include in an NDP subsequently transmitted to the first device, according to an embodiment. An uplink repetition (UL REP) field (sometimes referred to herein as a "UL training signal repetition field") 584 indicates a number instances of HE-LTFs, in each group 454 of HE-LTFs (FIGS. 4A and 4C), that that the communication device identified by the AID subfield 564 should include in a subsequent NDP transmitted to the first device.

A disambiguation subfield 588 is set to one to prevent a legacy communication device from wrongly determining that its AID is included in the NDPA 500. The disambiguation subfield 588 coincides with a most significant bit of a 12-bit AID subfield of a legacy NDPA frame if the NDPA frame 500 were parsed by a legacy communication device—the most significant bit of the 12-bit AID subfield in a legacy NDPA frame is always set to zero for legacy communication devices, in an embodiment.

The station information field 524 also includes reserved fields 592 and 596 set to predetermined values.

Figure 5B:
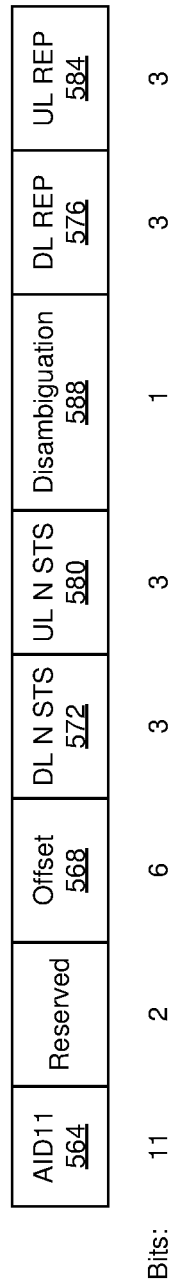
FIG. 5B is a diagram of an example station information field in the NDPA frame of FIG. 5A, according to another embodiment.

In other embodiments, the station information fields 524 have a different suitable format. For example, FIG. 5B is a diagram of an alternative station information field 598 that is used as the station information fields 524 of FIG. 5A instead of the station information field 524 illustrated in FIG. 5A, in another embodiment. FIG. 5B illustrates example lengths of subfields. In other embodiments, however, one or more of the subfields illustrated in FIG. 5B has another suitable length(s). Although FIG. 5B illustrates example arrangements of subfields, the subfields are suitably arranged differently in other embodiments.

One advantage of the example station information field 528 of FIG. 5A versus the example station information field 598 of FIG. 5B, is that the positions of reserved fields 592 and 596 overlap with positions of reserved fields in another NDPA frame formal proposed for the IEEE 802.11ax Standard.

Figure 6:
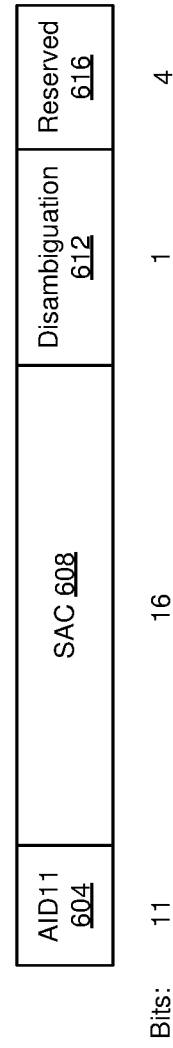
FIG. 6 is a diagram of an example additional station information field in the NDPA frame of FIG. 5A, according to another embodiment.

FIG. 6 is a diagram showing details of an example additional station information field 600 that is used as the additional station information field 528 of FIG. 5A, according to an embodiment. In other embodiments, the additional station information field 528 of FIG. 5A has another suitable format different than the format illustrated in FIG. 6.

FIG. 6 illustrates example lengths of subfields. In other embodiments, however, one or more of the fields or subfields illustrated in FIG. 5A has another suitable length(s). Although FIG. 5A illustrates example arrangements of fields and subfields, the fields and/or subfields are suitable arranged differently in other embodiments.

Referring now to FIGS. 5A, 5B, and 6, when a communication device determines that its AID matches any of the AIDs in subfields 564, the communication device processes the additional station information field 528/600.

The additional station information field 600 includes an AID subfield 604 that includes a reserved AID value. In an embodiment, the value of the AID subfield 604 is set to indicate that the additional station information field 600 is intended for all communication devices for which its AID matches any of the AIDs in subfields 564. In an embodiment, the value of the AID subfield 604 indicates that the additional station information field 600 has the format illustrated in FIG. 6. In an embodiment, the value of the AID subfield 604 indicates that the additional station information field 600 includes a synchronization parameter (e.g., an SAC as described above) for a ranging measurement exchange, according to an embodiment.

The additional station information field 600 includes a subfield 608 having a synchronization parameter (e.g., an SAC as described above) for a ranging measurement exchange, according to an embodiment.

The additional station information field 600 also includes a disambiguation subfield 612 that is similar to the disambiguation subfield 588 (FIGS. 5A-B) discussed above, according to an embodiment. The additional station information field 600 also includes a reserved field 616 set to a predetermined value.

Referring now to FIGS. 5A, 5B, and 6, in various other embodiments, one or more of the fields is omitted and/or additional fields are added. As an illustrative example, the UL N STS subfield 580 is omitted in some embodiments. For example, information in the UL N STS subfield 580 is conveyed in another manner, such as in an HE-SIG-A field of an NDP transmitted by the second communication device. As another illustrative example, the DL N STS subfield 572 is omitted in some embodiments. For example, information in the DL N STS subfield 572 is conveyed in another manner, such as in a negotiation prior to the ranging measurement exchange.

As another illustrative example, the AID11 subfield 546 is omitted in some embodiments and/or scenarios. For example, in some embodiments, only single user transmission are used in a ranging measurement exchange so the AID11 subfield 546 can be omitted.

Figure 7:
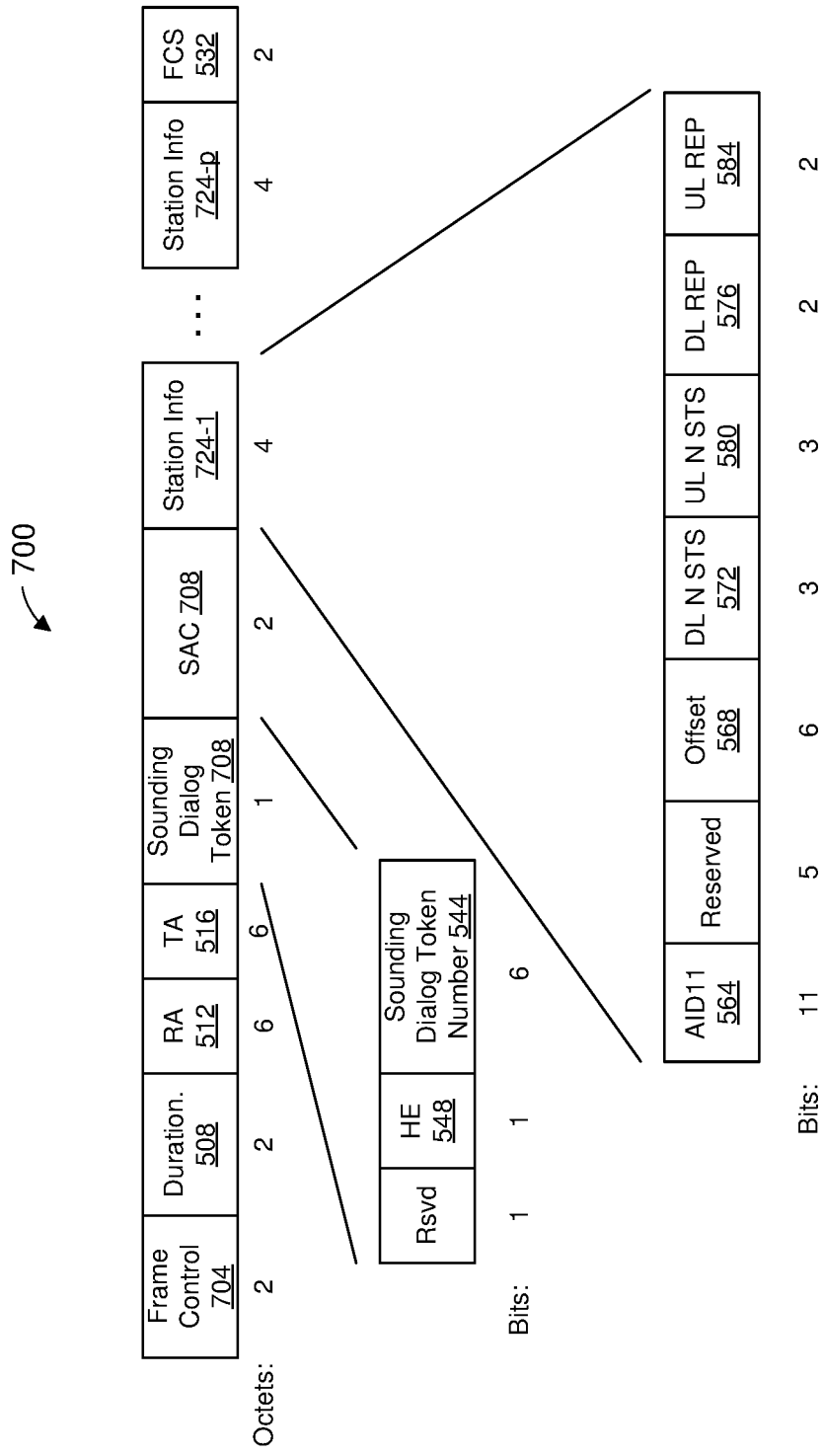
FIG. 7 is a diagram of another example NDPA frame for use in a ranging measurement exchange, according to another embodiment.

FIG. 7 is a diagram of another example NDPA frame 700 for ranging that the network interface 122 (FIG. 1) is configured to generate and transmit to one or more client stations 154 (e.g., the client station 154-1) as part of a ranging measurement exchange, according to another embodiment. The network interface 162 (FIG. 1) is also configured to transmit NDPA frame 700 to the AP 114 or another client station 154 as part of a ranging measurement exchange. For example, a PHY data unit (e.g., a PPDU) that includes the NDPA frame 700 is generated, and the PHY data unit is transmitted as part of a ranging measurement exchange.

In various embodiments, the NDPA frame 700 (or a similar NDPA frame) is used in one or more of the example ranging measurement exchanges described with reference to FIGS. 2A-C and 3, or is used in another suitable ranging measurement exchange. For example, the NDPA frame 700 is used for the NDPA frame 228 (FIGS. 2A and C) and/or for the NDPA frame 316 (FIG. 3), according to various embodiments.

FIG. 7 illustrates example lengths of fields and subfields. In other embodiments, however, one or more of the fields or subfields illustrated in FIG. 7 has another suitable length(s). Although FIG. 7 illustrates example arrangements of fields and subfields, the fields and/or subfields are suitably arranged differently in other embodiments.

The NDPA frame 700 is similar to the NDPA frame 500 of FIG. 5A, and elements with a same reference number are not described in detail for purposes of brevity.

The NDPA frame 700 includes a frame control field 704 set to a value that indicates the frame 700 is an NDPA frame for a ranging measurement exchange and has the format illustrated in FIG. 7.

The NDPA frame 700 includes a field 708 having a synchronization parameter (e.g., an SAC as described above) for a ranging measurement exchange, according to an embodiment.

The NDPA frame 700 also includes one or more station information fields 724. The station information fields are similar to the station information fields of FIGS. 5A and 5B, but a format of the station information fields 724 is different than the station information fields of FIGS. 5A and 5B. For example, the station information fields 724 do not include the disambiguation subfield 588.

Figure 8:
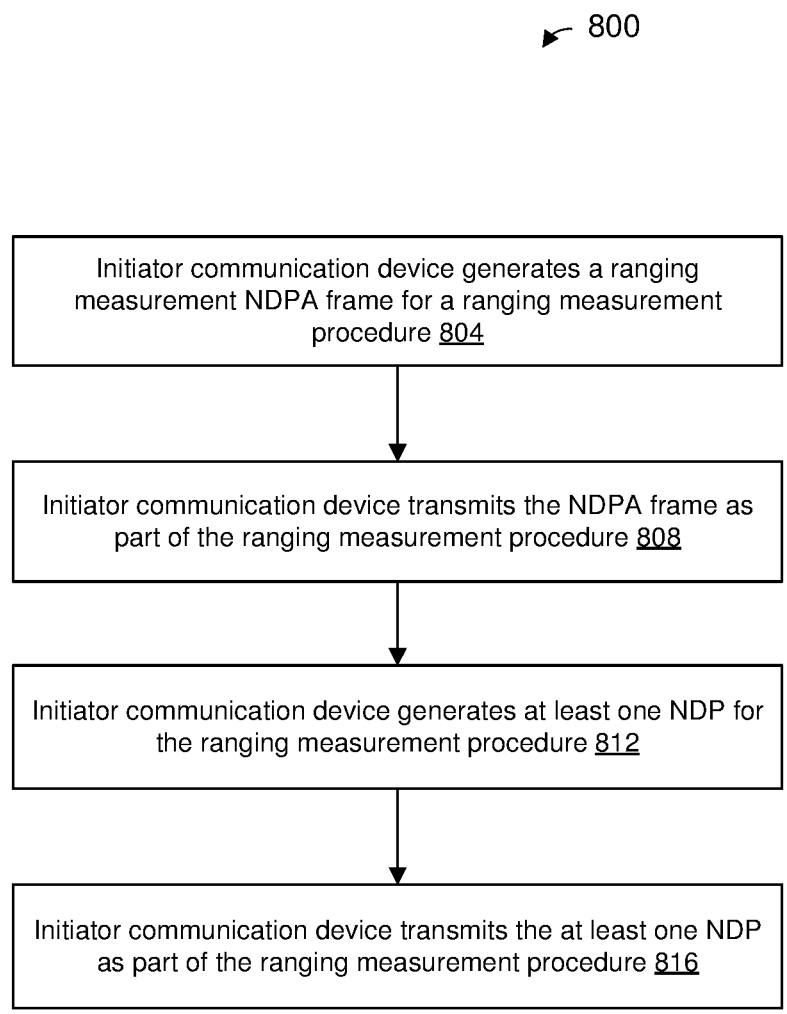
FIG. 8 is a flow diagram of an example method for announcing transmission of one or more NDPs in a ranging measurement procedure, according to another embodiment.

FIG. 8 is a flow diagram of an example method 800 for announcing transmission of one or more NDPs during a ranging measurement procedure, according to an embodiment. In some embodiments, the network interface device 122 and/or the network interface 162 of FIG. 1 is configured to implement the method 800. In other embodiments, the method 800 is implemented by another suitable communication device.

As will be described below, the method 800 involves transmitting an NDPA frame that includes information that is useful for and/or specific to the ranging measurement procedure. In various embodiments, the method 800 uses an NDPA frame having a format such as described above, or another suitable format.

At block 804, a first communication device generates an NDPA frame to announce a subsequent transmission of one or more NDPs to one or more second communication devices as part of a ranging measurement procedure. In an embodiment, generating the NDPA frame at block 804 comprises: including in the NDPA frame a training signal repetition field that specifies a number of instances of a training signal to be included in the one or more NDPs. In another embodiment, generating the NDPA frame at block 804 comprises: including in the NDPA frame a number of spatial streams field that specifies a number of spatial streams via which a first NDP, among the one or more NDPs, is to be transmitted. In another embodiment, generating the NDPA frame at block 804 comprises: generating an NDPA frame having the format illustrated in FIG. 5A.

In another embodiment, generating the NDPA frame at block 804 comprises: generating an NDPA frame having the format illustrated in FIG. 5A, but with station information fields 524 having the format illustrated in FIG. 5B. In another embodiment, generating the NDPA frame at block 804 comprises: generating an NDPA frame having the format illustrated in FIG. 7. In another embodiment, generating the NDPA frame at block 804 comprises: generating an NDPA frame having another suitable format that includes information specific to a ranging measurement procedure.

At block 808, the first communication device transmits the NDPA frame as part of the ranging measurement procedure. Transmitting the NDPA frame at block 808 informs the one or more second communication devices that the first communication device will subsequently transmit one or more NDPs as part of the ranging measurement procedure. Additionally, the NDPA frame transmitted at block 808 provides to the one or more second communication devices information that is useful for and/or specific to the ranging measurement procedure, such as one or more of i) information that specifies a number of instances of a training signal to be included in the one or more NDPs, ii) information that specifies a number of spatial streams via which a first NDP, among the one or more NDPs, will be transmitted, iii) other suitable information useful for and/or specific to the ranging measurement procedure.

At block 812, the first communication device generates at least one NDP for the ranging measurement procedure. As discussed above, transmission of the at least one NDP is used for measuring a time of flight between the first communication device and the one or more second communication devices. In an embodiment in which generating the NDPA frame at block 804 comprises including the training signal repetition field in the NDPA frame, generating the at least one NDP at block 812 comprises including one or more instances of the training signal, wherein a number of instances of the training signal in the at least one NDP equals the number of instances of the training signal indicated by the training signal repetition field in the NDPA frame.

At block 816, after transmitting the NDPA frame (e.g., a predefined time period (e.g., SIFS or another suitable time period) after transmission of the NDPA frame is completed), the first communication device transmits the one or more NDPs as part of the ranging measurement procedure. In an embodiment in which generating the NDPA frame at block 804 comprises including the number of spatial streams field in the NDPA frame, transmitting the one or more NDPs at block 816 comprises: transmitting at least one NDP via a number of spatial streams that is equal to the number of spatial streams specified by the number of spatial streams field in the NDPA frame.

In another embodiment, generating the NDPA frame at block 804 comprises: including in the NDPA frame a station information field that specifies a plurality of NDP parameters for a first one of the second communication devices among the one or more second communication devices; wherein the training signal repetition field is a training signal repetition subfield of the station information field; and wherein the one or more instances of the training signal in the at least one NDP correspond to the first one of the second communication devices.

In another embodiment, the station information field is a first station information field; the training signal repetition subfield of the first station information field is a first training signal repetition subfield; the training signal is a first training signal; generating the NDPA frame at block 804 further comprises: including in the NDPA frame a second station information field that specifies a plurality of NDP parameters for a second one of the second communication devices among the one or more second communication devices, wherein the second station information field comprises a second training signal repetition subfield that specifies a number of instances of a second training signal that corresponds to the second one of the second communication devices; and generating the at least one NDP at block 812 comprises: generating the at least one NDP to further include one or more instances of the second training signal in the at least one NDP, wherein a number of instances of the second training signal in the at least one NDP equals the number of instances of the second training signal indicated by the second training signal repetition subfield in the second station information field of the NDPA.

In another embodiment, the training signal repetition subfield of the station information field is a first training signal repetition subfield; the training signal is a first training signal; the one or more NDPs are one or more first NDPs; generating the NDPA frame at block 804 further comprises: including within the station information field a second training signal repetition subfield that specifies a number of instances of a second training signal to be included in a second NDP to be transmitted by the first one of the second communication devices after transmission of the one or more first NDPs; and the method further comprises: after transmitting the one or more first NDPs, receiving, at the first communication device, the second NDP as part of the ranging measurement procedure, wherein a number of instances of the second training signal in the second NDP equals the number of instances of the second training signal specified by the second training signal repetition subfield of the station information field within the NDPA.

In another embodiment, generating the NDPA frame at block 804 comprises: including in the NDPA frame a number of spatial streams field that specifies a number of spatial streams via which a first NDP, among the at least one NDP, is to be transmitted; and transmitting the at least one NDP at block 816 comprises transmitting the first NDP via a number of spatial streams that is equal to the number of spatial streams specified by the number of spatial streams field in the NDPA frame.

In another embodiment, the one or more NDPs are one or more first NDPs; the number of spatial streams field is a first number of spatial streams field; generating the NDPA frame at block 804 further comprises: including in the NDPA frame a second number of spatial streams field that specifies a number of spatial streams via which a second NDP to be transmitted by a first one of the second communication devices, among the one or more second communication devices, after transmission of the one or more first NDPs; and the method further comprises: after transmitting the one or more first NDPs, receiving, at the first communication device, the second NDP as part of the ranging measurement procedure, wherein the second NDP is received via a number of spatial streams that is equal to the number of spatial streams specified by the second number of spatial streams field in the NDPA.

In another embodiment, generating the NDPA frame at block 804 further comprises: including in the NDPA frame a synchronization parameter field that specifies a synchronization parameter for facilitating the first communication device and the one or more second communication devices remaining synchronized as to which training sequence signals are included in an NDP that follows the NDPA frame.

In another embodiment, generating the at least one NDP at block 812 comprises: including in the at least one NDP one or more training signals that are consistent with the synchronization parameter.

In another embodiment, the synchronization parameter is a secure authentication code (SAC) for a ranging measurement procedure.

In another embodiment, generating the at least one NDP at block 812 comprises: including in each NDP among the at least one NDP: a legacy portion of a PHY preamble, and the one or more instances of the training signal after the legacy portion of the PHY preamble.

In various embodiments, the method 800 is performed as part of a ranging measurement procedure such as the example ranging measurement procedure 200 discussed above with reference to FIG. 2A, the example ranging measurement procedure 260 discussed above with reference to FIG. 2C, the example ranging measurement procedure 300 discussed above with reference to FIG. 3, or another suitable ranging measurement procedure. For example, in an embodiment, the ranging measurement procedure includes, after transmitting the one or more NDPs at block 816, one or both of: i) transmitting, by the first communication device, ranging measurement feedback information to the one or more second communication devices, and ii) receiving, at the first communication device, ranging measurement feedback information from one or more second communication devices. In another embodiment, the ranging measurement procedure further includes, after or prior to transmitting the one or more NDPs at block 816, receiving, at the first communication device, one or more other NDPs from the one or more second communication devices. In another embodiment, the ranging measurement procedure further includes, determining time(s) of transmission of the one or more NDPs transmitted at block 816, and determining time(s) of reception of the one or more other NDPs received from the one or more second communication devices.

Embodiment 1: A method for announcing transmission of one or more null data packets (NDPs) during a ranging measurement procedure, the method comprising: generating, at a first communication device, an NDP announcement (NDPA) frame to announce a subsequent transmission of the one or more NDPs to one or more second communication devices as part of the ranging measurement procedure, wherein generating the NDPA frame comprises: including in the NDPA frame a training signal repetition field that specifies a number of instances of a training signal to be included in the one or more NDPs; transmitting, by the first communication device, the NDPA frame as part of the ranging measurement procedure; generating, at the first communication device, at least one NDP to include one or more instances of the training signal, wherein a number of instances of the training signal in the at least one NDP equals the number of instances of the training signal indicated by the training signal repetition field in the NDPA, and wherein the at least one NDP is among the one or more NDPs; after transmitting the NDPA frame, transmitting, by the first communication device, the one or more NDPs as part of the ranging measurement procedure.

Embodiment 2: The method of embodiment 1, wherein: generating the NDPA frame comprises: including in the NDPA frame a station information field that specifies a plurality of NDP parameters for a first one of the second communication devices among the one or more second communication devices; the training signal repetition field is a training signal repetition subfield of the station information field; and the one or more instances of the training signal in the at least one NDP correspond to the first one of the second communication devices.

Embodiment 3: The method of embodiment 2, wherein: the station information field is a first station information field; the training signal repetition subfield of the first station information field is a first training signal repetition subfield; the training signal is a first training signal; generating the NDPA frame further comprises: including in the NDPA frame a second station information field that specifies a plurality of NDP parameters for a second one of the second communication devices among the one or more second communication devices, wherein the second station information field comprises a second training signal repetition subfield that specifies a number of instances of a second training signal that correspond to the second one of the second communication devices; and generating the at least one NDP to further include one or more instances of the second training signal in the at least one NDP, wherein a number of instances of the second training signal in the at least one NDP equals the number of instances of the second training signal indicated by the second training signal repetition subfield in the second station information field of the NDPA.

Embodiment 4: The method of embodiment 2, wherein: the training signal repetition subfield of the station information field is a first training signal repetition subfield; the training signal is a first training signal; the one or more NDPs are one or more first NDPs; generating the NDPA frame further comprises: including within the station information field a second training signal repetition subfield that specifies a number of instances of a second training signal to be included in a second NDP to be transmitted by the first one of the second communication devices after transmission of the one or more first NDPs; and after transmitting the one or more first NDPs, receiving, at the first communication device, the second NDP as part of the ranging measurement procedure, wherein a number of instances of the second training signal in the second NDP equals the number of instances of the second training signal specified by the second training signal repetition subfield of the station information field within the NDPA.

Embodiment 5: The method of any of embodiments 1-4, wherein: generating the NDPA frame further comprises: including in the NDPA frame a number of spatial streams field that specifies a number of spatial streams via which a first NDP, among the at least one NDP, is to be transmitted; and transmitting the one or more NDPs as part of the ranging measurement procedure comprises transmitting the first NDP via a number of spatial streams that is equal to the number of spatial streams specified by the number of spatial streams field in the NDPA frame.

Embodiment 6: The method of embodiment 5, wherein: the one or more NDPs are one or more first NDPs; the number of spatial streams field is a first number of spatial streams field; generating the NDPA frame further comprises: including in the NDPA frame a second number of spatial streams field that specifies a number of spatial streams via which a second NDP to be transmitted by a first one of the second communication devices, among the one or more second communication devices, after transmission of the one or more first NDPs; and after transmitting the one or more first NDPs, receiving, at the first communication device, the second NDP as part of the ranging measurement procedure, wherein the second NDP is received via a number of spatial streams that is equal to the number of spatial streams specified by the second number of spatial streams field in the NDPA.

Embodiment 7: The method of any of embodiments 1-6, wherein: generating the NDPA frame further comprises: including in the NDPA frame a synchronization parameter field that specifies a synchronization parameter for facilitating the first communication device and the one or more second communication devices remaining synchronized as to which training sequence signals are included in an NDP that follows the NDPA frame.

Embodiment 8: The method of embodiment 7, wherein generating the at least one NDP comprises: including in the at least one NDP one or more training signals that are consistent with the synchronization parameter.

Embodiment 9: The method of either of embodiments 7 or 8, wherein: the synchronization parameter is a secure authentication code (SAC) for a ranging measurement procedure.

Embodiment 10: The method of any of embodiments 1-9, wherein generating the at least one NDP comprises including in each NDP among the at least one NDP: a legacy portion of a PHY preamble; and the one or more instances of the training signal after the legacy portion of the PHY preamble.

Embodiment 11: A wireless device, comprising: a network interface device associated with a first communication device, wherein the network interface device is implemented on one or more integrated circuit (IC) devices, and wherein the network interface device is configured to: generate a null data packet (NDP) announcement (NDPA) frame to announce a subsequent transmission of one or more NDPs to one or more second communication devices as part of a ranging measurement procedure, wherein generating the NDPA frame comprises: including in the NDPA frame a training signal repetition field that specifies a number of instances of a training signal to be included in the one or more NDPs, transmit the NDPA frame as part of the ranging measurement procedure, generate at least one NDP to include one or more instances of the training signal, wherein a number of instances of the training signal in the at least one NDP equals the number of instances of the training signal indicated by the training signal repetition field in the NDPA, and wherein the at least one NDP is among the one or more NDPs, and after transmitting the NDPA frame, transmit the one or more NDPs as part of the ranging measurement procedure.

Embodiment 12: The wireless device of embodiment 11, wherein: the network interface device is configured to: include in the NDPA frame a station information field that specifies a plurality of NDP parameters for a first one of the second communication devices among the one or more second communication devices; the training signal repetition field is a training signal repetition subfield of the station information field; and the one or more instances of the training signal in the at least one NDP correspond to the first one of the second communication devices.

Embodiment 13: The wireless device of embodiment 12, wherein: the station information field is a first station information field; the training signal repetition subfield of the first station information field is a first training signal repetition subfield; the training signal is a first training signal; the network interface device is configured to: include in the NDPA frame a second station information field that specifies a plurality of NDP parameters for a second one of the second communication devices among the one or more second communication devices, wherein the second station information field comprises a second training signal repetition subfield that specifies a number of instances of a second training signal that correspond to the second one of the second communication devices, and generate the at least one NDP to further include one or more instances of the second training signal in the at least one NDP, wherein a number of instances of the second training signal in the at least one NDP equals the number of instances of the second training signal indicated by the second training signal repetition subfield in the second station information field of the NDPA.

Embodiment 14: The wireless device of embodiment 12, wherein: the training signal repetition subfield of the station information field is a first training signal repetition subfield; the training signal is a first training signal; the network interface device is configured to: include within the station information field a second training signal repetition subfield that specifies a number of instances of a second training signal to be included in a second NDP to be transmitted by the first one of the second communication devices after transmission of the one or more first NDPs, and after transmitting the one or more first NDPs, receive the second NDP as part of the ranging measurement procedure, wherein a number of instances of the second training signal in the second NDP equals the number of instances of the second training signal specified by the second training signal repetition subfield of the station information field within the NDPA.

Embodiment 15: The wireless device of any of embodiments 11-14, wherein the network interface device is configured to: include in the NDPA frame a number of spatial streams field that specifies a number of spatial streams via which a first NDP, among the at least one NDP, is to be transmitted; and transmit the first NDP via a number of spatial streams that is equal to the number of spatial streams specified by the number of spatial streams field in the NDPA frame.

Embodiment 16: The wireless device of embodiment 15, wherein: the one or more NDPs are one or more first NDPs; the number of spatial streams field is a first number of spatial streams field; the network interface device is configured to: include in the NDPA frame a second number of spatial streams field that specifies a number of spatial streams via which a second NDP to be transmitted by a first one of the second communication devices, among the one or more second devices, after transmission of the one or more first NDPs, and after transmitting the one or more first NDPs, receive the second NDP as part of the ranging measurement procedure, wherein the second NDP is received via a number of spatial streams that is equal to the number of spatial streams specified by the second number of spatial streams field in the NDPA.

Embodiment 17: The wireless device of any of embodiments 11-16, wherein the network interface device is configured to: include in the NDPA frame a synchronization parameter field that specifies a synchronization parameter for facilitating the first communication device and the one or more second communication devices remaining synchronized as to which training sequence signals are included in an NDP that follows the NDPA frame.

Embodiment 18: The wireless device of embodiment 17, wherein the network interface device is configured to: include in the at least one NDP one or more training signals that are consistent with the synchronization parameter.

Embodiment 19: The wireless device of either of embodiments 17 or 18, wherein: the synchronization parameter is a secure authentication code (SAC) for a ranging measurement procedure.

Embodiment 20: The wireless device of any of embodiments 119, wherein the network interface device is configured to include in each NDP among the at least one NDP: a legacy portion of a PHY preamble; and the one or more instances of the training signal after the legacy portion of the PHY preamble.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions are stored in a computer readable memory such as a random access memory (RAM), a read only memory (ROM), a flash memory, etc. The software or firmware instructions include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for announcing transmission of one or more null data packets (NDPs) during a ranging measurement procedure, the method comprising:
generating, at a first communication device, an NDP announcement (NDPA) frame to announce a subsequent transmission of the one or more NDPs to one or more second communication devices as part of the ranging measurement procedure, wherein generating the NDPA frame comprises: including in the NDPA frame a training signal repetition field that specifies a number of instances of a training signal to be included in each of the one or more NDPs;
transmitting, by the first communication device, the NDPA frame as part of the ranging measurement procedure;
generating, at the first communication device, at least one NDP to include two or more instances of the training signal, wherein a number of instances of the training signal in the at least one NDP equals the number of instances of the training signal indicated by the training signal repetition field in the NDPA, and wherein the at least one NDP is among the one or more NDPs;
after transmitting the NDPA frame, transmitting, by the first communication device, the one or more NDPs as part of the ranging measurement procedure;
wherein:
generating the NDPA frame comprises: including in the NDPA frame a station information field that specifies a plurality of NDP parameters for a first one of the second communication devices among the one or more second communication devices;

the training signal repetition field is a training signal repetition subfield of the station information field; and the one or more instances of the training signal in the at least one NDP correspond to the first one of the second communication devices;

wherein:

the training signal repetition subfield of the station information field is a first training signal repetition subfield;

the training signal is a first training signal;

the one or more NDPs are one or more first NDPs;

generating the NDPA frame further comprises: including within the station information field a second training signal repetition subfield that specifies a number of instances of a second training signal to be included in a second NDP to be transmitted by the first one of the second communication devices after transmission of the one or more first NDPs; and after transmitting the one or more first NDPs, receiving, at the first communication device, the second NDP as part of the ranging measurement procedure, wherein a number of instances of the second training signal in the second NDP equals the number of instances of the second training signal specified by the second training signal repetition subfield of the station information field within the NDPA.

2. The method of claim 1, wherein:

the station information field is a first station information field;

the training signal repetition subfield of the first station information field is a first training signal repetition subfield;

the training signal is a first training signal;

generating the NDPA frame further comprises: including in the NDPA frame a second station information field that specifies a plurality of NDP parameters for a second one of the second communication devices among the one or more second communication devices, wherein the second station information field comprises a second training signal repetition subfield that specifies a number of instances of a second training signal that correspond to the second one of the second communication devices; and generating the at least one NDP to further include one or more instances of the second training signal in the at least one NDP, wherein a number of instances of the second training signal in the at least one NDP equals the number of instances of the second training signal indicated by the second training signal repetition subfield in the second station information field of the NDPA.

3. The method of claim 1, wherein:

generating the NDPA frame further comprises: including in the NDPA frame a synchronization parameter field that specifies a synchronization parameter for facilitating the first communication device and the one or more second communication devices remaining synchronized as to which training sequence signals are included in an NDP that follows the NDPA frame.

4. The method of claim 3, wherein generating the at least one NDP comprises:

including in the at least one NDP one or more training signals that are consistent with the synchronization parameter.

5. The method of claim 3, wherein:

the synchronization parameter is a secure authentication code (SAC) for a ranging measurement procedure.

6. The method of claim 1, wherein generating the at least one NDP comprises including in each NDP among the at least one NDP:

a legacy portion of a PHY preamble; and the one or more instances of the training signal after the legacy portion of the PHY preamble.

7. A method for announcing transmission of one or more null data packets (NDPs) during a ranging measurement procedure, the method comprising:

generating, at a first communication device, an NDP announcement (NDPA) frame to announce a subsequent transmission of the one or more NDPs to one or more second communication devices as part of the ranging measurement procedure, wherein generating the NDPA frame comprises: including in the NDPA frame a training signal repetition field that specifies a number of instances of a training signal to be included in each of the one or more NDPs;

transmitting, by the first communication device, the NDPA frame as part of the ranging measurement procedure;

generating, at the first communication device, at least one NDP to include two or more instances of the training signal, wherein a number of instances of the training signal in the at least one NDP equals the number of instances of the training signal indicated by the training signal repetition field in the NDPA, and wherein the at least one NDP is among the one or more NDPs;

after transmitting the NDPA frame, transmitting, by the first communication device, the one or more NDPs as part of the ranging measurement procedure;

wherein:

generating the NDPA frame further comprises: including in the NDPA frame a number of spatial streams field that specifies a number of spatial streams via which a first NDP, among the at least one NDP, is to be transmitted; and transmitting the one or more NDPs as part of the ranging measurement procedure comprises transmitting the first NDP via a number of spatial streams that is equal to the number of spatial streams specified by the number of spatial streams field in the NDPA frame;

wherein:

the one or more NDPs are one or more first NDPs;

the number of spatial streams field is a first number of spatial streams field;

generating the NDPA frame further comprises: including in the NDPA frame a second number of spatial streams field that specifies a number of spatial streams via which a second NDP to be transmitted by a first one of the second communication devices, among the one or more second communication devices, after transmission of the one or more first NDPs; and after transmitting the one or more first NDPs, receiving, at the first communication device, the second NDP as part of the ranging measurement procedure, wherein the second NDP is received via a number of spatial streams that is equal to the number of spatial streams specified by the second number of spatial streams field in the NDPA.

8. A first communication device, comprising:

a network interface device associated with the first communication device, wherein the network interface device is implemented on one or more integrated circuit (IC) devices, and wherein the network interface device is configured to:

generate a null data packet (NDP) announcement (NDPA) frame to announce a subsequent transmission of one or more NDPs to one or more second communication devices as part of a ranging measurement procedure, wherein generating the NDPA frame comprises: including in the NDPA frame a training signal repetition field that specifies a number of instances of a training signal to be included in each of the one or more NDPs, transmit the NDPA frame as part of the ranging measurement procedure, generate at least one NDP to include two or more instances of the training signal, wherein a number of instances of the training signal in the at least one NDP equals the number of instances of the training signal indicated by the training signal repetition field in the NDPA, and wherein the at least one NDP is among the one or more NDPs, and after transmitting the NDPA frame, transmit the one or more NDPs as part of the ranging measurement procedure;

wherein:

the network interface device is configured to: include in the NDPA frame a station information field that specifies a plurality of NDP parameters for a first one of the second communication devices among the one or more second communication devices;

the training signal repetition field is a training signal repetition subfield of the station information field; and the one or more instances of the training signal in the at least one NDP correspond to the first one of the second communication devices;

wherein:

the training signal repetition subfield of the station information field is a first training signal repetition subfield;

the training signal is a first training signal;

the network interface device is configured to:

include within the station information field a second training signal repetition subfield that specifies a number of instances of a second training signal to be included in a second NDP to be transmitted by the first one of the second communication devices after transmission of the one or more first NDPs, and after transmitting the one or more first NDPs, receive the second NDP as part of the ranging measurement procedure, wherein a number of instances of the second training signal in the second NDP equals the number of instances of the second training signal specified by the second training signal repetition subfield of the station information field within the NDPA.

9. The first communication device of claim 8, wherein: the station information field is a first station information field;

the training signal repetition subfield of the first station information field is a first training signal repetition subfield;

the training signal is a first training signal;

the network interface device is configured to:

include in the NDPA frame a second station information field that specifies a plurality of NDP parameters for a second one of the second communication devices among the one or more second communication devices, wherein the second station information field comprises a second training signal repetition subfield that specifies a number of instances of a second training signal that correspond to the second one of the second communication devices, and generate the at least one NDP to further include one or more instances of the second training signal in the at least one NDP, wherein a number of instances of the second training signal in the at least one NDP equals the number of instances of the second training signal indicated by the second training signal repetition subfield in the second station information field of the NDPA.

10. The first communication device of claim 8, wherein the network interface device is configured to:

include in the NDPA frame a synchronization parameter field that specifies a synchronization parameter for facilitating the first communication device and the one or more second communication devices remaining synchronized as to which training sequence signals are included in an NDP that follows the NDPA frame.

11. The first communication device of claim 10, wherein the network interface device is configured to:

include in the at least one NDP one or more training signals that are consistent with the synchronization parameter.

12. The first communication device of claim 10, wherein: the synchronization parameter is a secure authentication code (SAC) for a ranging measurement procedure.

13. The first communication device of claim 8, wherein the network interface device is configured to include in each NDP among the at least one NDP:

a legacy portion of a PHY preamble; and the one or more instances of the training signal after the legacy portion of the PHY preamble.

14. A first communication device, comprising:

a network interface device associated with a first communication device, wherein the network interface device is implemented on one or more integrated circuit (IC) devices, and wherein the network interface device is configured to:

generate a null data packet (NDP) announcement (NDPA) frame to announce a subsequent transmission of one or more NDPs to one or more second communication devices as part of a ranging measurement procedure, wherein generating the NDPA frame comprises: including in the NDPA frame a training signal repetition field that specifies a number of instances of a training signal to be included in each of the one or more NDPs, transmit the NDPA frame as part of the ranging measurement procedure, generate at least one NDP to include two or more instances of the training signal, wherein a number of instances of the training signal in the at least one NDP equals the number of instances of the training signal indicated by the training signal repetition field in the NDPA, and wherein the at least one NDP is among the one or more NDPs, and after transmitting the NDPA frame, transmit the one or more NDPs as part of the ranging measurement procedure;

wherein the network interface device is configured to:

include in the NDPA frame a number of spatial streams field that specifies a number of spatial streams via which a first NDP, among the at least one NDP, is to be transmitted; and transmit the first NDP via a number of spatial streams that is equal to the number of spatial streams specified by the number of spatial streams field in the NDPA frame;

wherein:
the one or more NDPs are one or more first NDPs;
the number of spatial streams field is a first number of spatial streams field;
the network interface device is configured to:
include in the NDPA frame a second number of spatial streams field that specifies a number of spatial streams via which a second NDP to be transmitted by a first one of the second communication devices, among the one or more second devices, after transmission of the one or more first NDPs, and
after transmitting the one or more first NDPs, receive the second NDP as part of the ranging measurement procedure, wherein the second NDP is received via a number of spatial streams that is equal to the number of spatial streams specified by the second number of spatial streams field in the NDPA.

* * * * *